US007746730B2

(12) United States Patent
Olayinka et al.

(10) Patent No.: US 7,746,730 B2
(45) Date of Patent: Jun. 29, 2010

(54) MULTIFUNCTION REMINDER SYSTEM

(76) Inventors: Jonah Olayinka, 4 Quinby Ct., Parsippany, NJ (US) 07054; Thomas James Formanes, 9 Longridge Ct., Ledgewood, NJ (US) 07852

( * ) Notice: Subject to any disclaimer, the term of this patent is extended or adjusted under 35 U.S.C. 154(b) by 73 days.

(21) Appl. No.: 11/850,147

(22) Filed: Sep. 5, 2007

(65) Prior Publication Data
US 2009/0059729 A1 Mar. 5, 2009

(51) Int. Cl.
G04B 19/00 (2006.01)
(52) U.S. Cl. ....................................... 368/28
(58) Field of Classification Search ............. 368/28–30; 345/169
See application file for complete search history.

(56) References Cited

U.S. PATENT DOCUMENTS

| | | | |
|---|---|---|---|
| 4,228,470 A | 10/1980 | Rahamin et al. | |
| 4,302,752 A | 11/1981 | Weitzler | |
| 4,368,988 A | 1/1983 | Tahara et al. | |
| 5,124,959 A * | 6/1992 | Yamazaki et al. | 368/231 |
| 5,555,536 A | 9/1996 | Rolf et al. | |
| 5,696,496 A | 12/1997 | Kumar | |
| 5,708,627 A | 1/1998 | Gormley | |
| 5,742,736 A | 4/1998 | Haddock | |
| 6,022,323 A * | 2/2000 | Jackson | 600/551 |
| 6,438,221 B1 | 8/2002 | Lee et al. | |
| 6,453,281 B1 | 9/2002 | Walters et al. | |
| 6,661,438 B1 * | 12/2003 | Shiraishi et al. | 715/835 |
| 6,678,215 B1 | 1/2004 | Treyz et al. | |
| 6,720,980 B1 | 4/2004 | Lui et al. | |
| 6,809,724 B1 * | 10/2004 | Shiraishi et al. | 345/169 |
| 7,373,610 B2 * | 5/2008 | Nakamura | 715/765 |
| 2002/0191035 A1 * | 12/2002 | Selent | 345/866 |
| 2006/0040643 A1 * | 2/2006 | O'Connor | 455/412.1 |
| 2006/0158154 A1 * | 7/2006 | Maurilus | 320/115 |
| 2007/0086275 A1 * | 4/2007 | Robinson et al. | 368/72 |
| 2007/0217292 A1 * | 9/2007 | Williams | 368/29 |

(Continued)

OTHER PUBLICATIONS

Author: Palm, Inc. Title: Using a voice memo as an alarm, Article ID: 31270, www.palm.com Publication Date: Unclear.

(Continued)

Primary Examiner—Felix O Figueroa
(74) Attorney, Agent, or Firm—Thomas L. Adams

(57) ABSTRACT

A reminder system has a user interface with a microphone, display and at least one manually operable control. A processor that is coupled to the user interface has a memory and an input for receiving image information signifying at least one predetermined image for storage in the memory. The processor can display simultaneously on the display a calendar image and the predetermined image. In another mode the processor can display at least the predetermined image without displaying the calendar image. In yet another mode the screen can display a conventional clock face with minute and hour hands. As an option, the user can upload a number of images that can then replace the hours numerals on the clock face. Using the user interface and the microphone one can store in the memory at least one pair of a spoken message and a scheduled time. The processor can make the spoken message automatically available at the scheduled time. The processor can be coupled to a remote interface that has a sound sensor for producing a remote sound signal. The remote interface can send the remote sound signal to the processor for storage in the memory for later retrieval.

29 Claims, 19 Drawing Sheets

DIGITAL PERSONALIZED CALENDAR SCREEN – PICTURE SETUP MODE

U.S. PATENT DOCUMENTS

2008/0168205 A1* 7/2008 McCoy et al. ............... 710/304
2008/0175103 A1* 7/2008 Nakamura et al. ............ 368/10
2008/0205205 A1* 8/2008 Chiang et al. ............ 369/30.04
2008/0207263 A1* 8/2008 May et al. ................ 455/556.2

OTHER PUBLICATIONS

Author: Unknown Title: Digital Voice Recorder Product Information Resource Guide Version 1.0 Publication: May 2003.

* cited by examiner

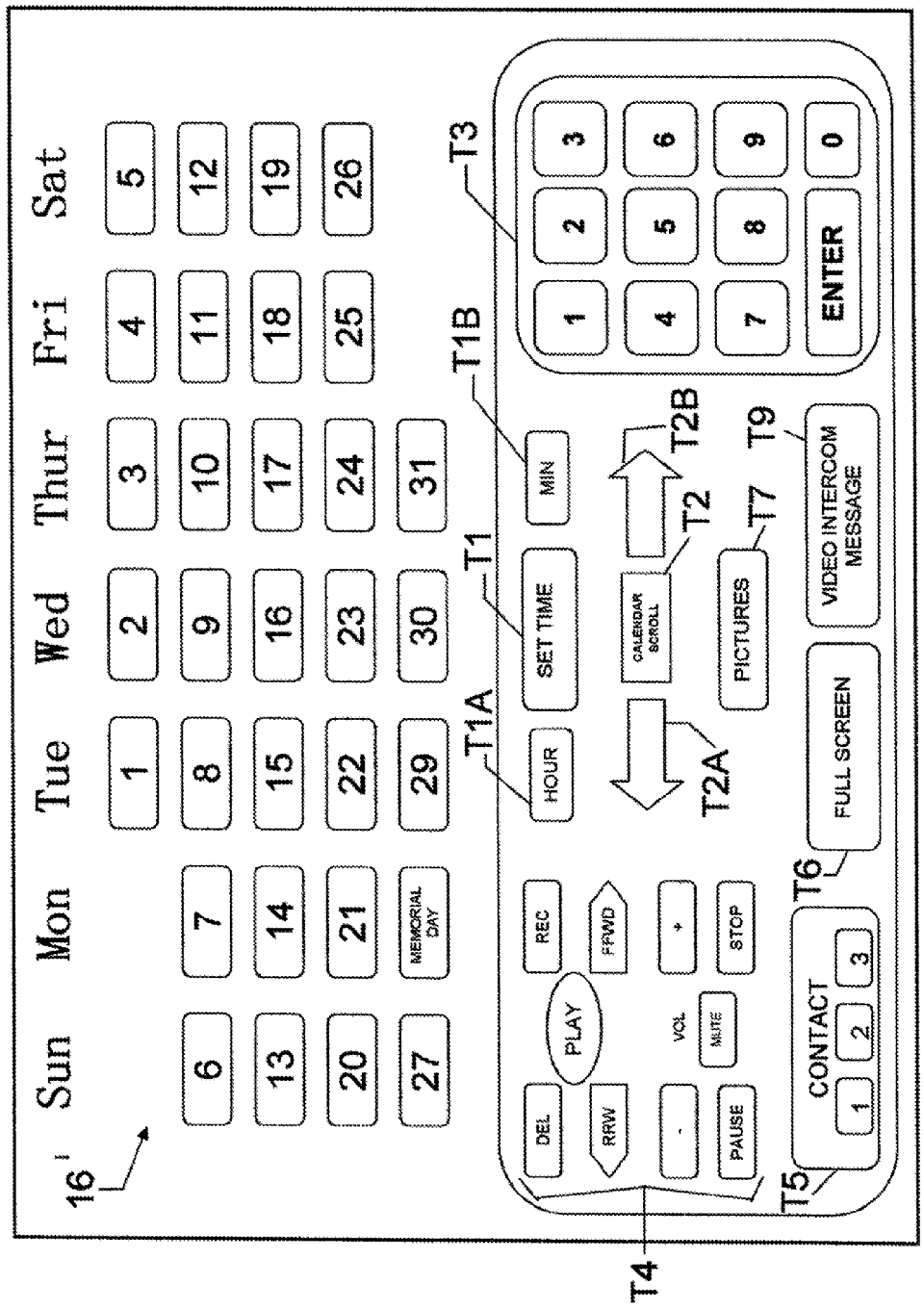
FIG. 7A DIGITAL PERSONALIZED CALENDAR SCREEN - FUNCTION MODE - AUDIO

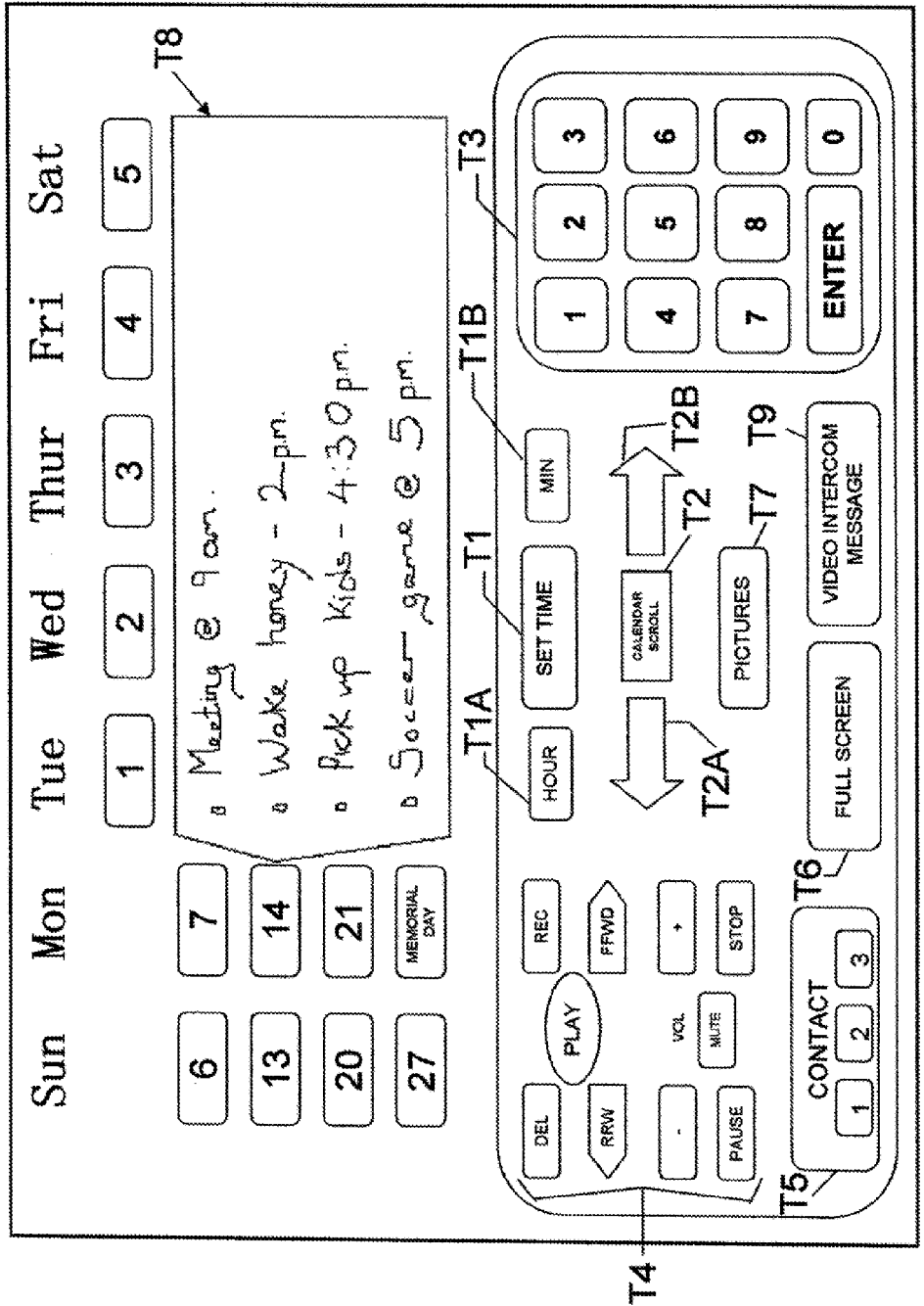
FIG. 7B  DIGITAL PERSONALIZED CALENDAR SCREEN - FUNCTION MODE - TEXT

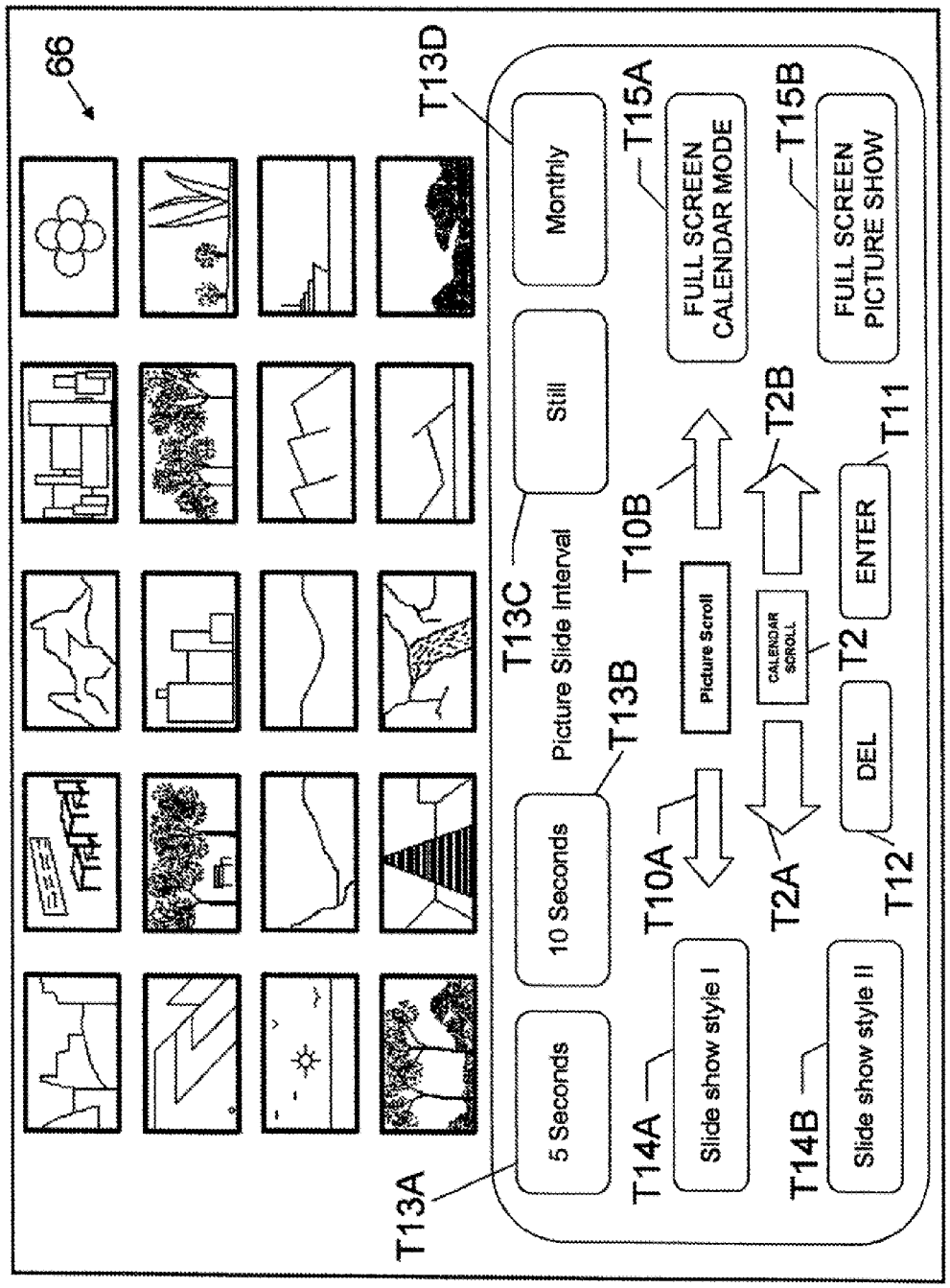
FIG. 7C  DIGITAL PERSONALIZED CALENDAR SCREEN – PICTURE SETUP MODE

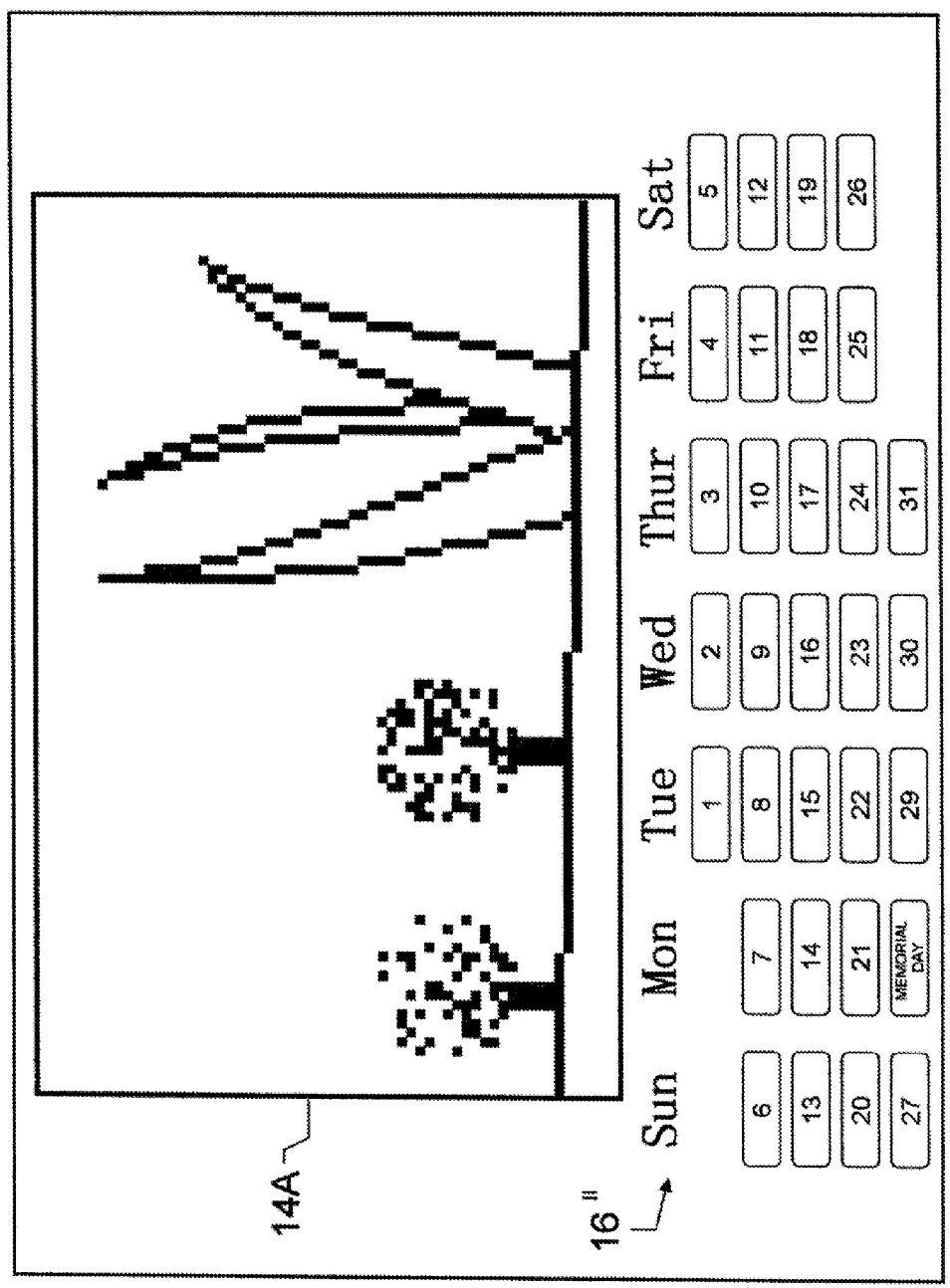
FIG. 7D DIGITAL PERSONALIZED CALENDAR SCREEN – FULL CALENDAR MODE

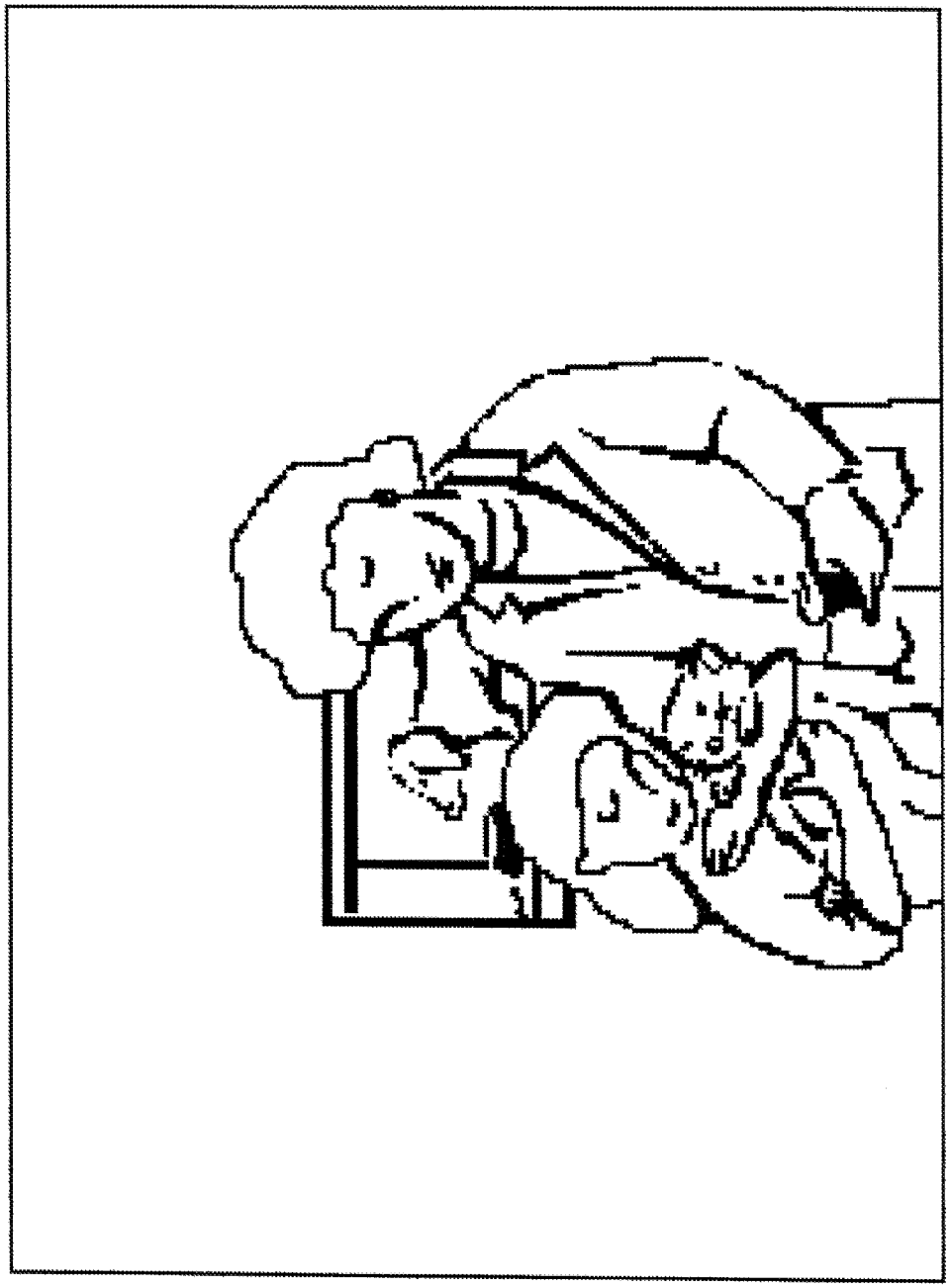
FIG. 7E DIGITAL PERSONALIZED CALENDAR SCREEN – FULL PICTURE SHOW MODE

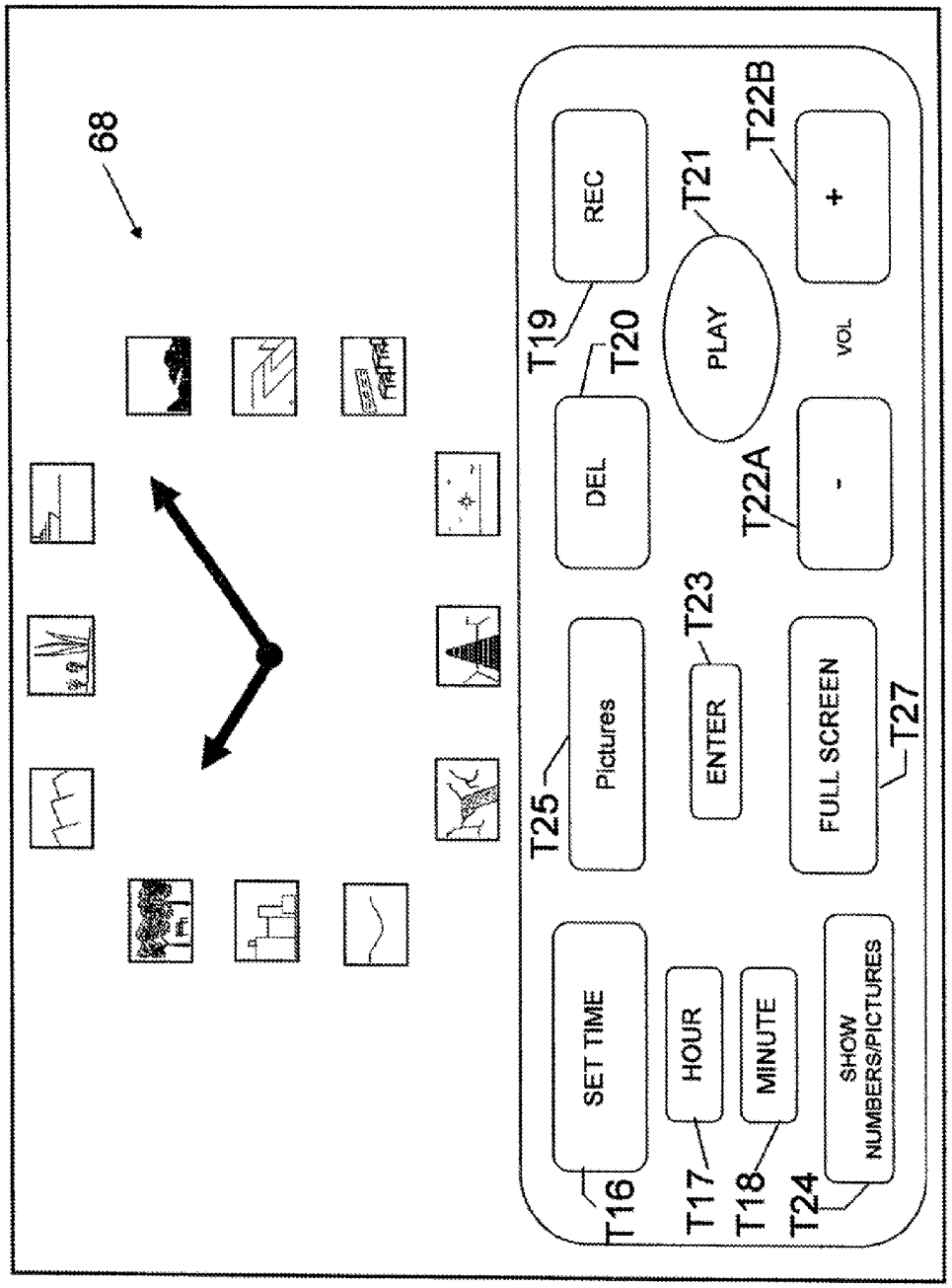
FIG. 8A  DIGITAL PERSONALIZED VOICE CLOCK SCREEN - FUNCTION MODE

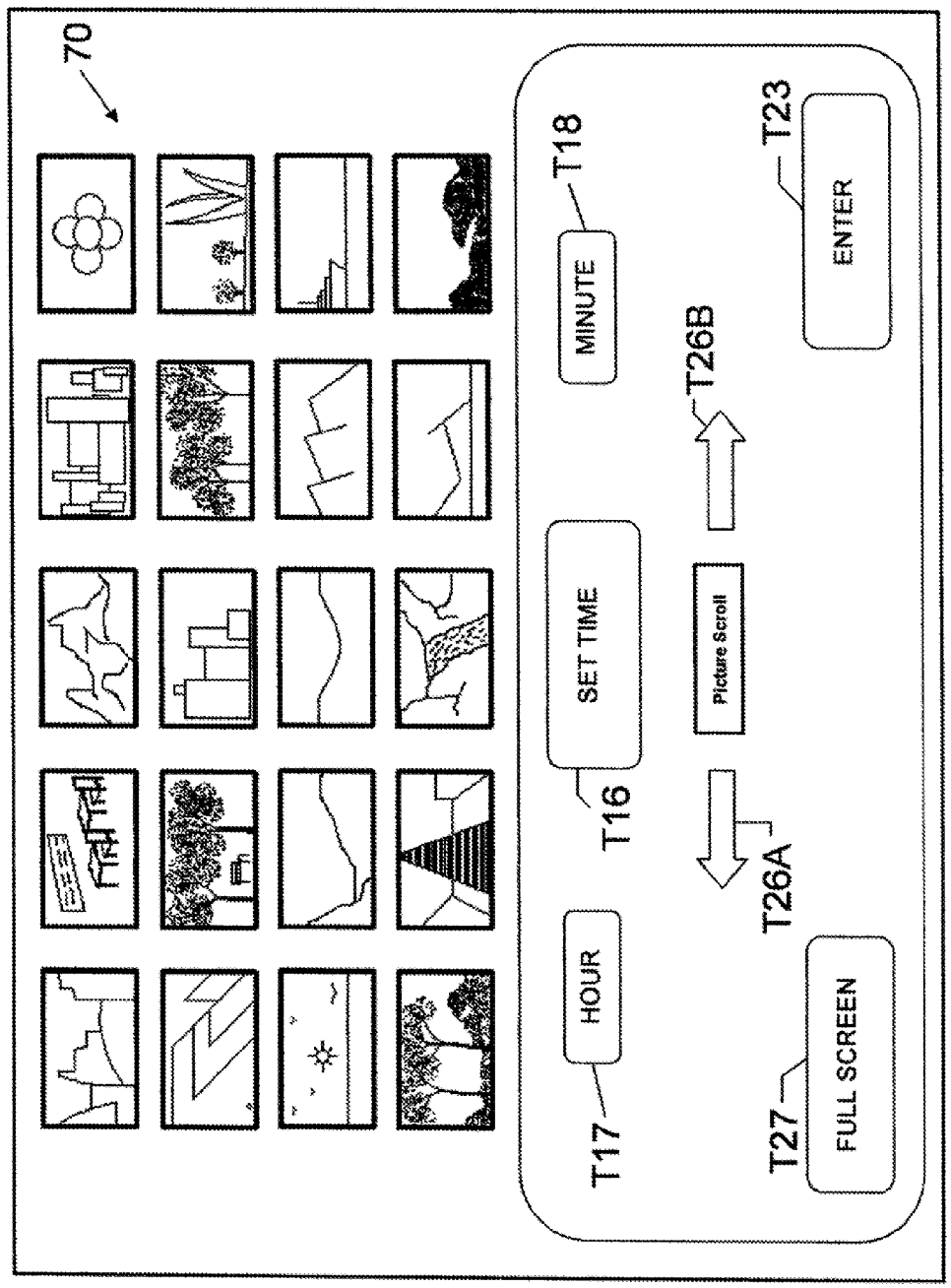
FIG. 8B DIGITAL PERSONALIZED VOICE CLOCK SCREEN – PICTURE SETUP MODE

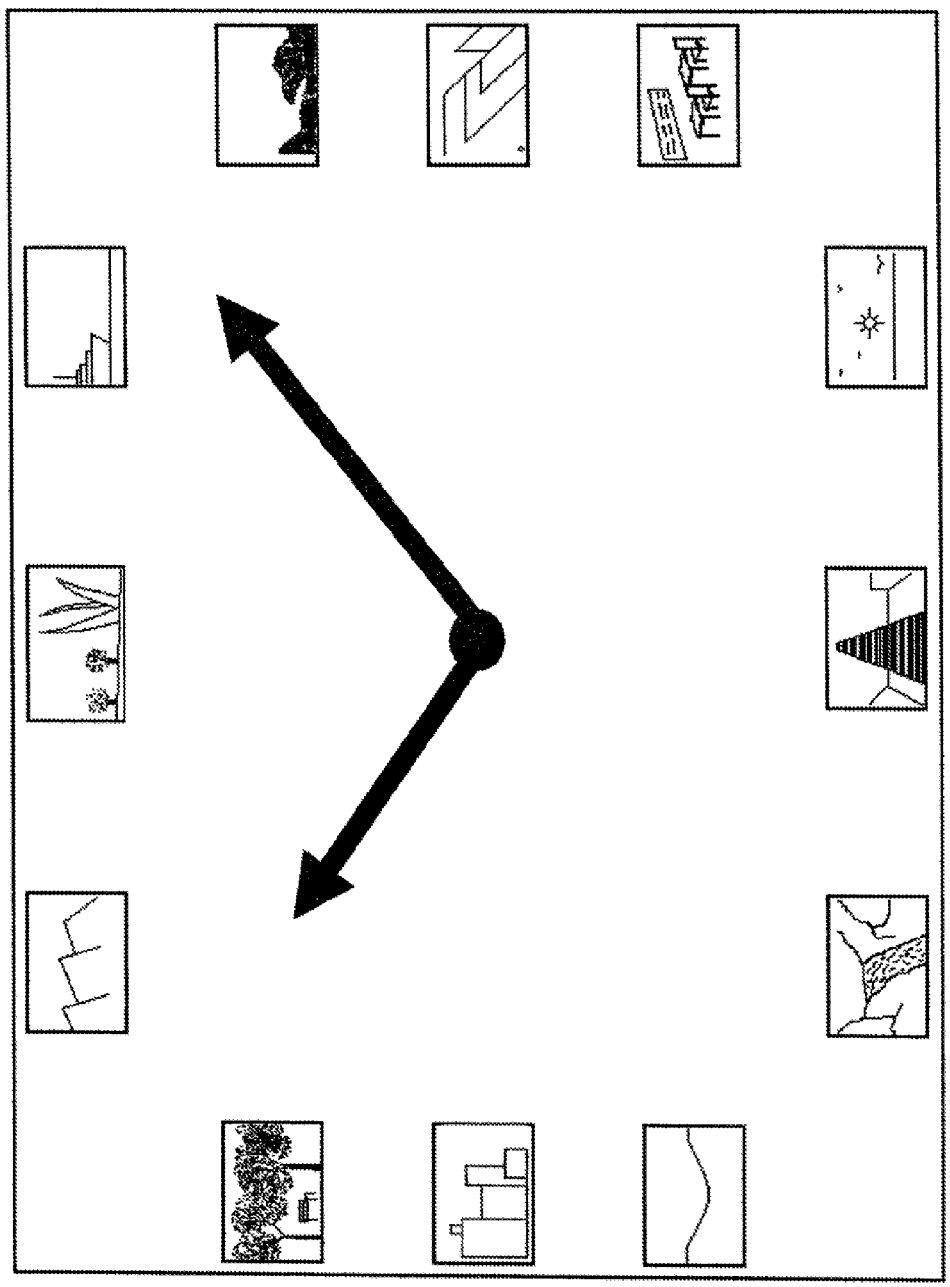

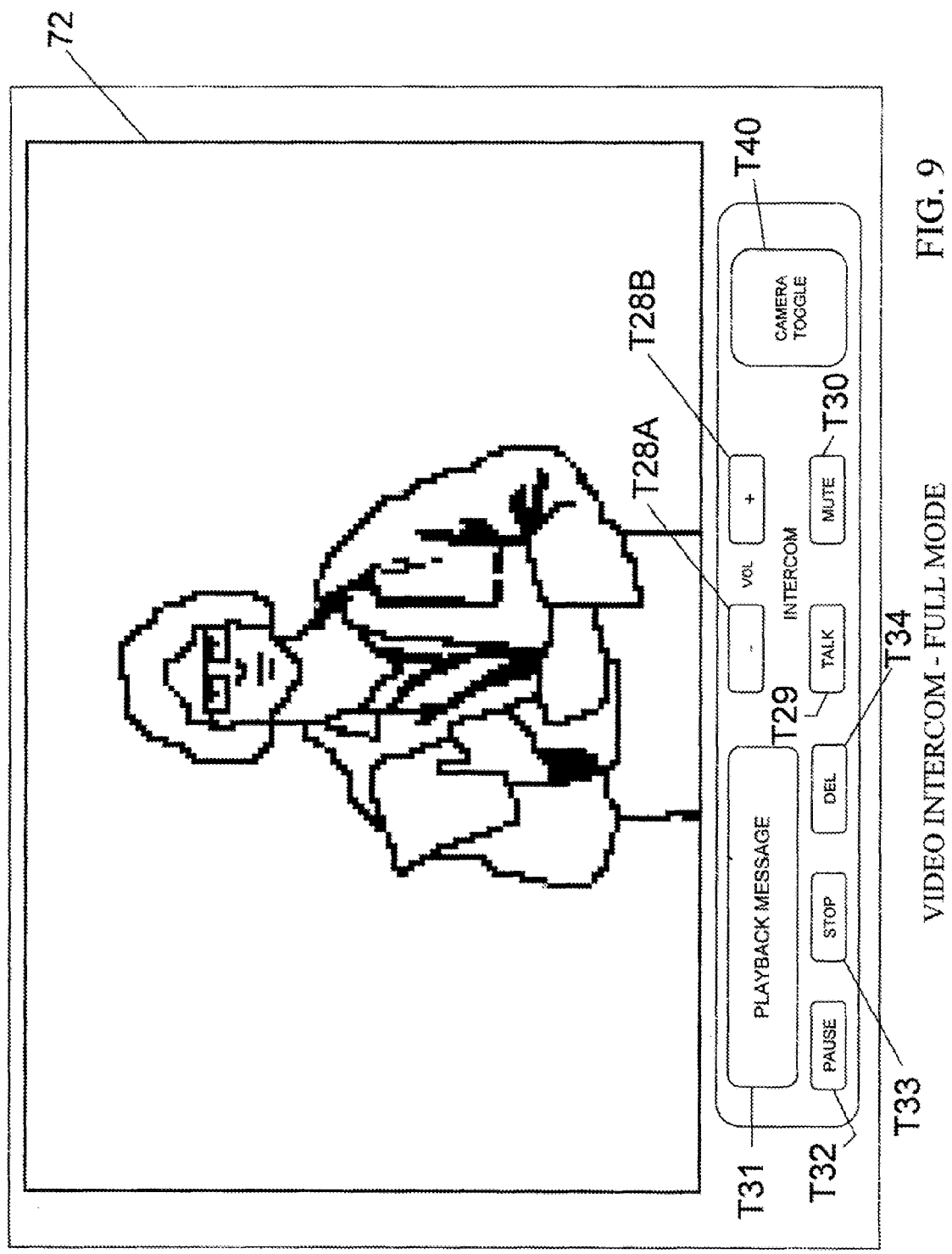

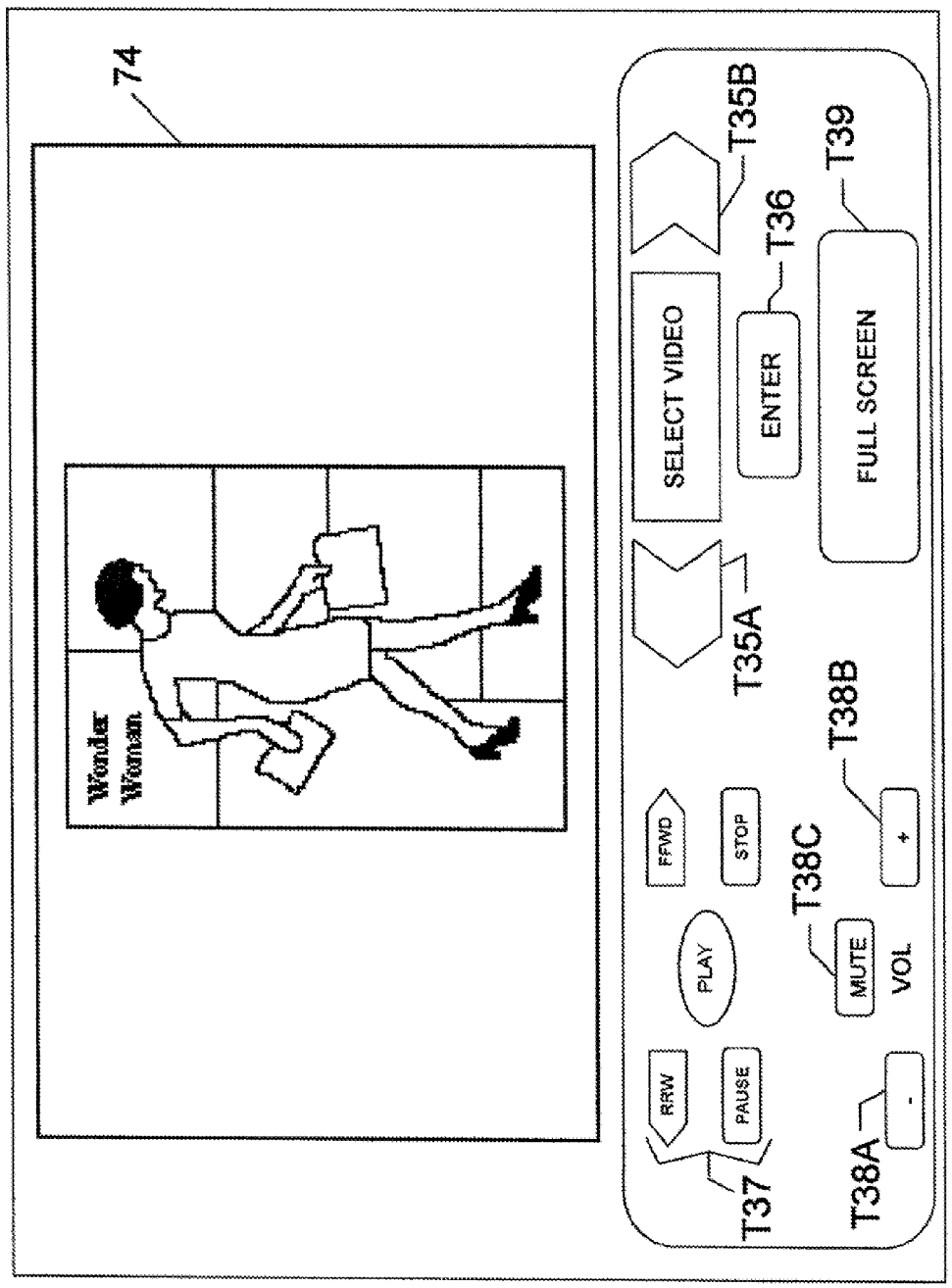
FIG. 10A   MUSIC/VIDEO - FUNCTION MODE

MUSIC/VIDEO - FULL MODE

MULTIFUNCTION REMINDER SYSTEM

BACKGROUND OF THE INVENTION

1. Field of the Invention

The present invention relates to systems for recording and playing back spoken reminder messages, and in particular to enabling play back on a user designated schedule.

2. Description of Related Art

An alarm can be built into an alarm clock, wrist watch or clock radio, to sound an alarm at a predetermined time. These arrangements are relatively limited in that usually only one alarm can be preprogrammed at a time and no information is given about the reason for the alarm. Furthermore, these arrangements are designed to trigger an alarm every day at the same time. Thus, these arrangements cannot be used to schedule an appointment several days in advance (e.g., schedule a doctor's appointment, luncheon date, business meeting, etc.).

A common way of scheduling an appointment is to mark a calendar. Known calendars have a grid representing each day of the month in a format large enough to allow one to mark an appointment in the grid cell representing the date of the appointment. Although these calendars are made relatively large, inadequate space exists for writing much detail about the appointment, especially when multiple appointments fall on the same date. Even when such a calendar is able to contain sufficient information about an appointment, a user must become disciplined into regularly examining the calendar in order to be reminded of scheduled appointments.

Since these appointment calendars can be relatively large they compete for wall space with other items such as a wall clock or decorative wall hangings.

Such calendars are often provided in a book style and are hung open with the calendar grid on one page and a decorative image on the facing page. These decorative images are chosen by the printer or manufacturer, but are not customized with images that are personally meaningful to the owner of the calendar. While customizing a calendar is always possible, the number of pictures a user can display for each month is limited and the time, trouble, and expense of customization will deter most.

A user can upload personally meaningful images to a computer and display them sequentially using presentation software. For example, a series of photographs of a family vacation can be displayed on a computer screen and the user can select the manner of image succession. Specifically, the user can select the exposure time for each image and how one picture transitions to another. For example, one image can simply abruptly replace another. Alternatively, one image can fade and be replaced by another that grows in size, detail, intensity, or contrast. In some cases, the current picture can "move" off screen, while another moves in to take its place. While a user can upload such personal images with effects for display on a computer, such images are often hidden behind other computer program windows that the user is working on.

The front door of residences are often fitted with a peephole to allow visual identification of visitors. If the visitor arrives when the resident is absent, limited options exist for leaving a message. The visitor may not be prepared to secure a written message to the door. Moreover, the absent resident may want to identify the missed visitor by appearance and voice characteristics.

In existing security systems a closed-circuit television camera can be mounted at a front door to identify a visitor, but are inconvenient for identifying missed visitors. Even if such systems record images of missed visitors, rewinding to the time of visitation can be very difficult, if in fact the occurrence of a visit is even known. Moreover, in residential applications the indoor monitor for the outdoor security camera occupies wall or shelf space and will compete for such space with other items such as the above-mentioned appointment calendar, wall clock, and decorative wall hangings, as well as other items such as home entertainment systems (televisions, etc.).

Conventional telephone answering machines are well adapted to record and conveniently play back the voice messages of missed callers.

See also U.S. Pat. Nos. 4,228,470; 4,302,752; 4,368,988; 5,555,536; 5,696,496; 5,708,627; 5,742,736; 6,438,221; 6,453,281; 6,678,215; and 6,720,980.

SUMMARY OF THE INVENTION

In accordance with the illustrative embodiments demonstrating features and advantages of the present invention, there is provided a reminder system including a user interface having a microphone, display and at least one manually operable control. The reminder system also includes a processor coupled to the user interface. The processor has a memory and an input for receiving image information signifying at least one predetermined image for storage in the memory. The processor can display simultaneously on the display a calendar image and the predetermined image based on the image information in the memory. The user interface and the microphone can be operated to store in the memory at least one pair of a spoken message and a scheduled time. The processor can make the spoken message automatically available at the scheduled time.

In accordance with another aspect of the invention, there is provided a reminder system including a user interface having a microphone, display and at least one manually operable control. The system also includes a remote interface having a sound sensor for producing a remote sound signal. Also included is a processor coupled to the user interface and the remote interface. The processor has a memory, and is operable to display a calendar image. The user interface and the microphone can be operated to store in the memory at least one pair of a spoken message and a scheduled time. The processor can make the spoken message automatically available at the scheduled time. The auxiliary interface can be operated to send the auxiliary sound signal to the processor for storage in the memory. The user interface can be operated to retrieve the sound signal from the memory.

In accordance with yet another aspect of the invention, there is provided a reminder system including a user interface having a microphone, display and at least one manually operable control. The reminder system also includes a processor coupled to the user interface. The processor has a memory and an input for receiving image information signifying at least one predetermined image for storage in the memory. The processor can in a first mode display a calendar image and in a second mode display from the memory the at least one predetermined image without displaying the calendar image. The user interface can be manually operated to select one of the first mode and the second mode. The user interface and the microphone can be operated to store in the memory at least one pair of a spoken message and a scheduled time. The processor can make the spoken message automatically available at the scheduled time.

By employing apparatus of the foregoing type an improved reminder system is achieved. In the disclosed embodiment a thin case has on its front a relatively large display, in this case a touchscreen display. In one mode the screen can display a calendar having a number of boxes arranged and labeled as the days of the month. This display may have a user-selected image either above or underlying the days grid. The user can upload a number of images that can then be associated with different months using a special function screen. This function screen can be obtained by pressing a function button on the case. The features on this and other function screens may be password-protected. Using this function screen, each month can be assigned a unique picture.

The function screen allows the user to select a day and time and then record a voice message. Selecting and holding the target day briefly (e.g. 2 seconds) causes a notepad to be displayed next to the day enabling the option to write messages with a supplied stylus. Multiple voice messages can also be recorded for each day by choosing different voice mailboxes. Thereafter the user can return to the full-screen mode showing just a calendar with a user-selected picture. When the prescheduled date and time arrives a message light on the case illuminates informing the user of the availability of the scheduled voice message, which can then be played back. In some cases the reminder system will automatically dial preprogrammed telephone numbers and play the voice message back over the telephone.

In another disclosed mode the screen can display a conventional clock face with minute and hour hands. As an option, the user can upload a number of images that can then replace the hours numerals on the clock face, using another function screen. This function screen also allows the user to record brief three second messages that will be associated with each hour. Then in the clock mode, the system will automatically play back on the hour the associated one of the messages.

The disclosed screen can also be used as a video monitor for displaying images from a camera at, for example, the front door. This camera can be placed in a compact unit that also has a microphone, speaker, outdoor temperature sensor, and push buttons. These buttons can be operated to allow a visitor to record a message or to talk intercom-style to a user at the in-house unit. If no one is present to receive the visitor's message, a message can be recorded either as audio alone or video with audio. The message light on the in-house unit will then illuminate so that the user will notice the existence of the visitor's recording and can then play back the recording.

The system may also employ a portable secondary video display unit for allowing a user to observe video from a remote camera. In addition to a remote camera at, for example, a front door, auxiliary transmitters may be stationed at various locations for sending video and audio to an in-house unit and to the above-mentioned secondary video display unit. These features enable the user to monitor any room, for example a child's room, while working outside in the garden away from the main user interface.

Images uploaded by the user can also be displayed as a slide presentation without displaying a calendar or clock face. The user can select images on a dedicated function screen. The user can also designate the picture cycle time as well as the transition style (abrupt, fade, moving in and out, etc.). The system can also have an input for delivering more general media content such as a music video, full-length movie, etc. The user can use controls on a setup screen to allow the media to be started, stopped, paused, fast-forwarded, rewound, etc.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein:

FIG. 7A shows a first function screen for setting up a calendar mode associated with the system of FIG. 1;

FIG. 7B shows a second function screen for setting up the calendar mode associated with the system of FIG. 1;

FIG. 7C shows a third function screen for setting up the calendar mode associated with the system of FIG. 1;

FIG. 7D shows a first full mode screen for the calendar mode associated with the system of FIG. 1;

FIG. 7E shows a second full mode screen for the calendar mode associated with the system of FIG. 1;

FIG. 8A shows a first function screen for setting up a clock mode associated with the system of FIG. 1;

FIG. 8B shows a second function screen for setting up the clock mode associated with the system of FIG. 1;

FIG. 8C shows a full mode screen for the clock mode associated with the system of FIG. 1;

FIG. 9 shows a video intercom screen associated with the system of FIG. 1;

FIG. 10A shows a function screen for setting up a media mode associated with the system of FIG. 1;

DETAILED DESCRIPTION OF THE PREFERRED EMBODIMENTS

Figure 1:
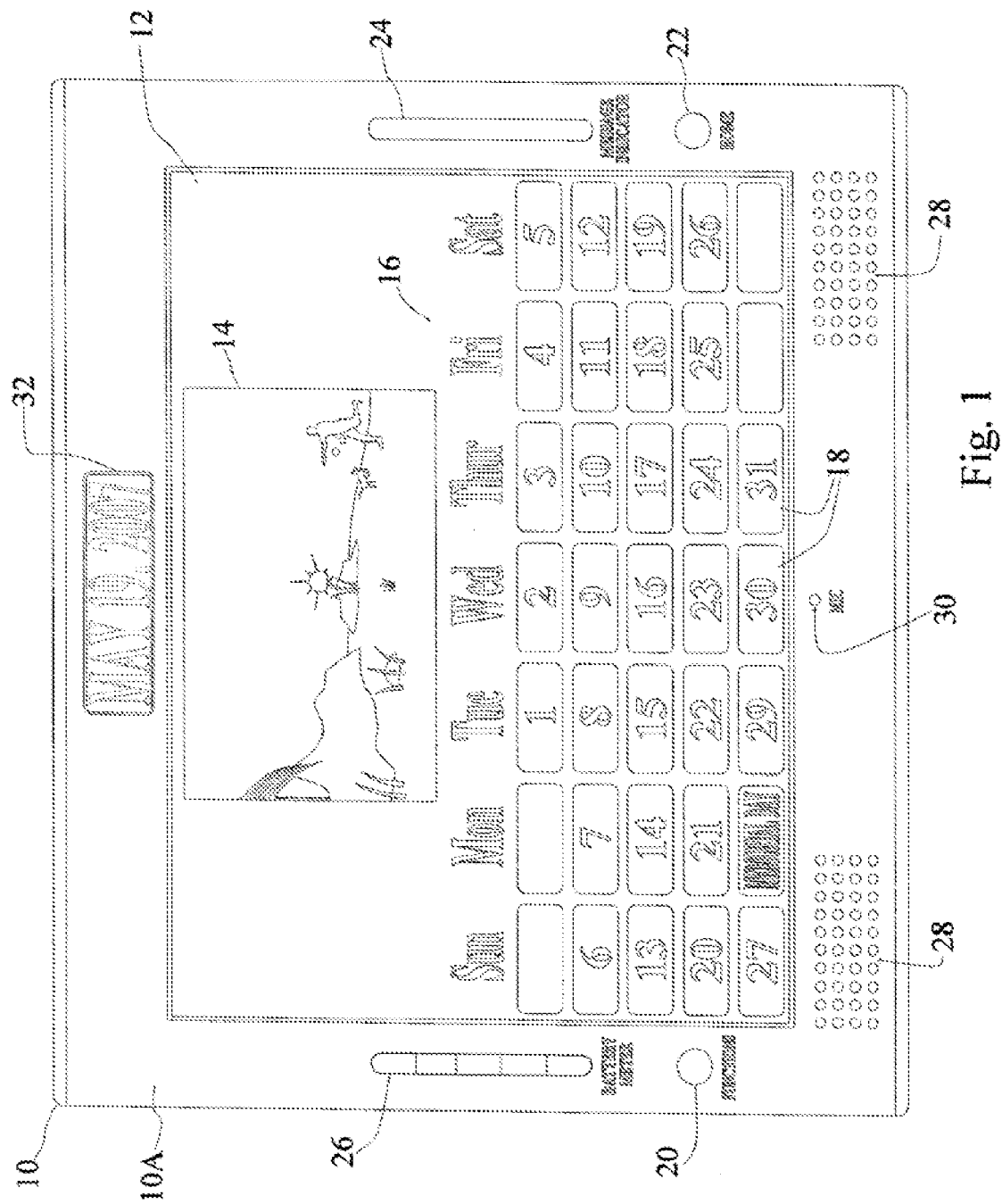
FIG. 1 is a front view of a reminder system in accordance with principles of the present invention.
Figure 2:
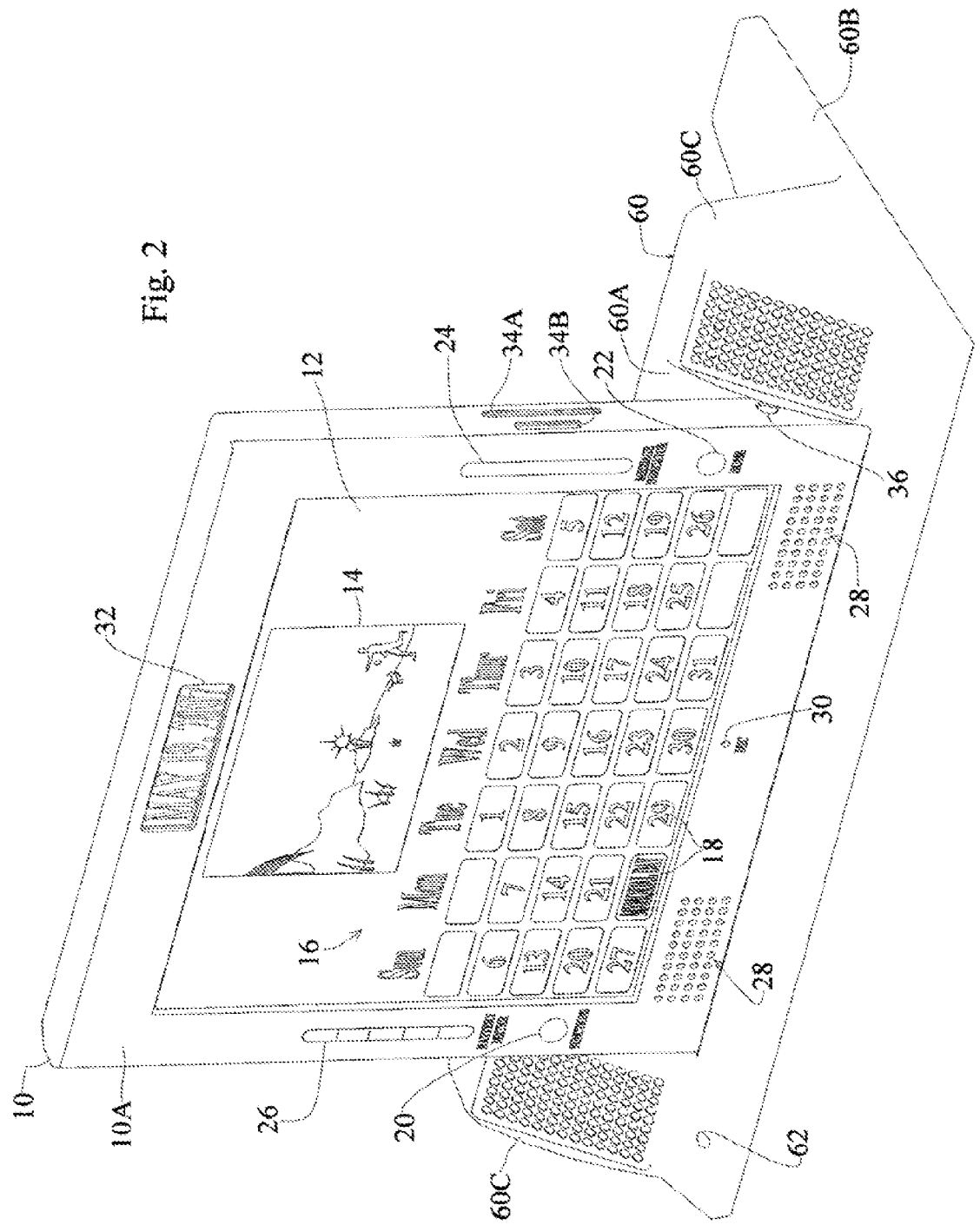
FIG. 2 is a perspective view of the reminder system of FIG. 1 installed in a dedicated cradle.

Referring to FIGS. 1 and 2, housing 10 is a relatively thin plastic case having a front display in the form of a touch screen 12. Housing 10 has on the right a message indicator 24 in the form of an LED, as well as a battery meter indicator 26 in the form of a stack of LEDs on the left that may be illuminated in groups to produce a bar graph indicating the state of charge. Located above display screen 12 is an annunciator 32 in the form of a small LCD screen shown displaying the date, although as explained further hereinafter, other short messages can be displayed as well. A microphone 30 is located below display screen 12 and a pair of stereo speakers 28 are located on either side of the microphone.

Functions pushbutton 20 and home pushbutton 22 are located to the left and right, respectively, of the display 12. Items 20-32 and display 12 are part of what is herein referred to as a user interface.

Encircling display 12 is a faceplate 10A with cutouts for items 20-32. Faceplate 10A is replaceable so a user can change the color and appearance of housing 10. The back of housing 10 has a rear magnet to allow mounting on a refrigerator door or the like.

Input socket 36 for an AC power adapter is located on the right edge of case 10. Located on the left edge of case 10 are a headphone jack, a modular telephone jack, a memory stick port, (all shown hereinafter schematically) and a slot for the supplied stylus (not shown).

Located on the right edge of housing 10 are a pair of inputs 34A and 34B for uploading image information such as monthly images used to form the predetermined image 14, or for supplying media information such as a video stream supplied from a separate player, mass storage device, or a remote camera, in a manner to be described presently. Connections (shown hereinafter schematically) for a remote interface, additional auxiliary transmitters, and a secondary video display unit are located at the rear of case 10, however, these connections may be wireless in some instances.

Figure 3:
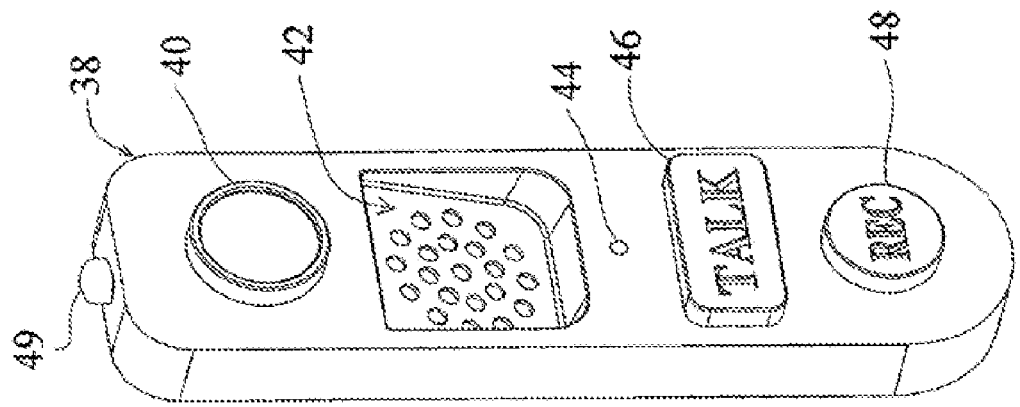
FIG. 3 is a perspective view of a remote unit that can cooperate with the reminder system of FIG. 1.

Referring to FIG. 3, a wireless remote interface 38 is shown as a case having a CCD image sensor 40 for producing a video signal. Interface 38 also has a speaker 42 and sound sensor (microphone) 44. An outdoor temperature sensor 49 is also built into interface 38 to sense and send temperature data to the system of FIG. 1. As explained further hereinafter interface 38 can be mounted outside next to a front door so a visitor can press pushbutton 46 (also referred to as visitor triggerable input) and talk intercom-style. Another pushbutton input 48 can be used if no one is home and the visitor wishes to record a message (either audio only or video with audio).

Figure 11:
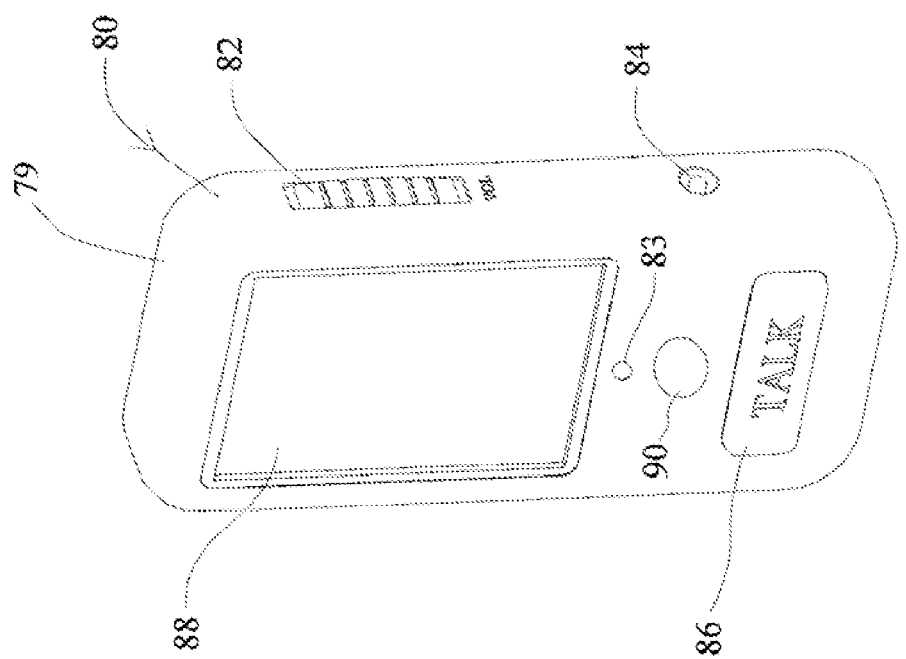
FIG. 11 is a perspective view of a secondary video display unit that can cooperate with the reminder system of FIG. 1.

Referring to FIG. 11, a secondary video display unit 80 is shown having a relatively thin plastic housing 79 with a front display screen 88 in the form of a color LCD. A camera toggle button 90 is located between display 88 and talk button 86. A volume control 82 is located on the right edge of housing 79 above an input socket 84 for an AC power adapter. A microphone 83 is located between display 88 and camera toggle button 90 and a speaker (shown hereinafter schematically) is located on the back of housing 79. Connections (shown hereinafter schematically) for a remote interface and up to four additional auxiliary transmitters are located at the rear of housing 79, however, these connections may be wireless in some instances, making unit 80 handheld and portable.

Figure 12:
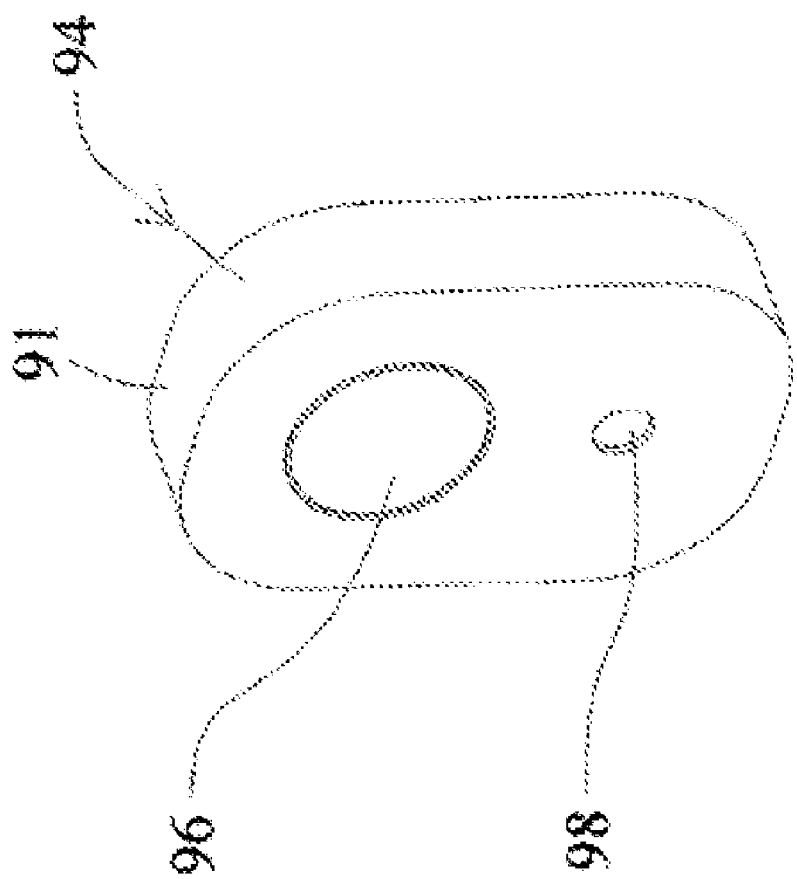
FIG. 12 is a perspective view of an auxiliary transmitter that can cooperate with the reminder system of FIG. 1.

Referring to FIG. 12, a wireless auxiliary transmitter 94 is shown having a CCD image sensor 96 for producing a video signal mounted in a relatively thin plastic housing 91 above a microphone 98 for producing an audio signal.

Figure 4:
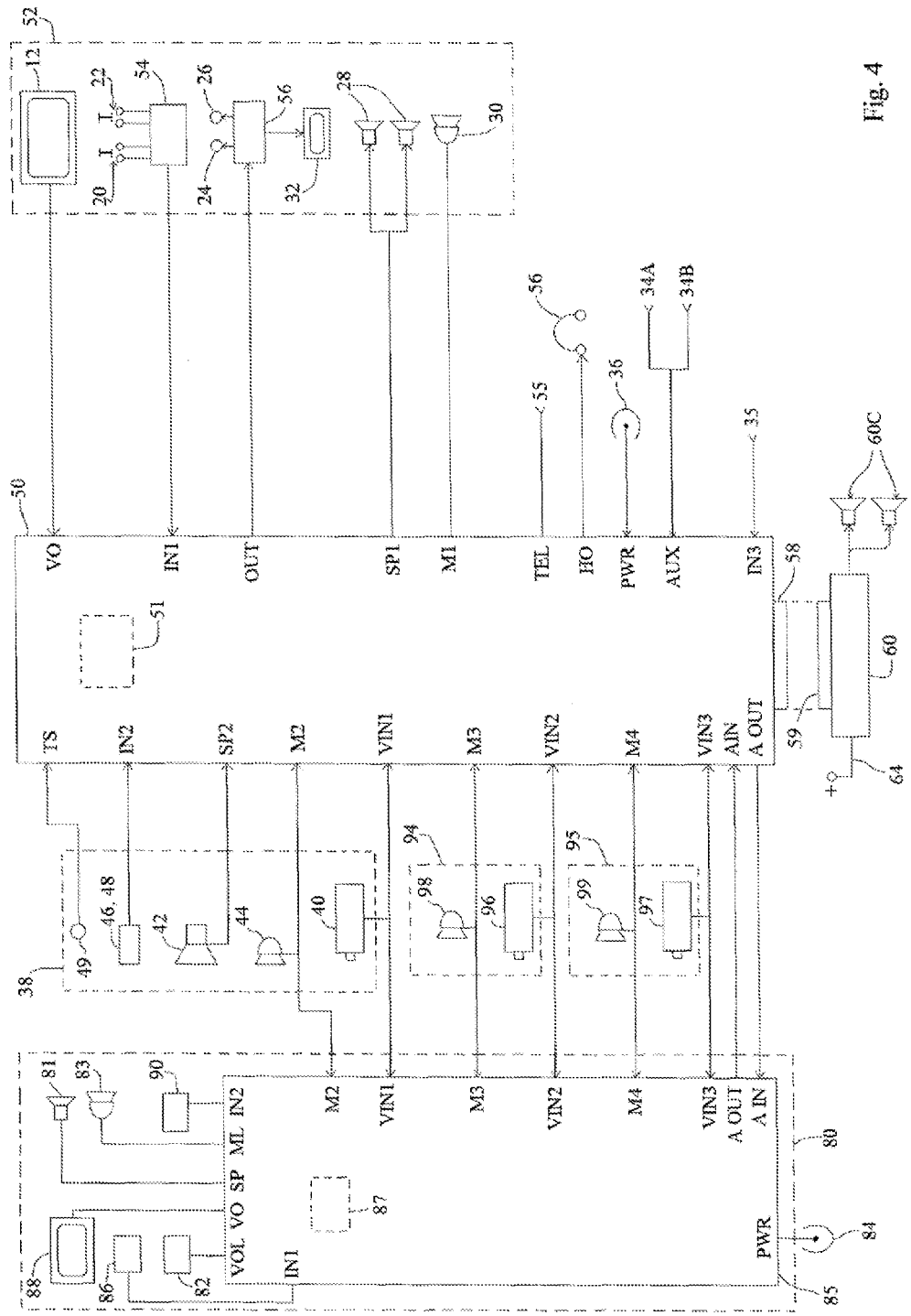
FIG. 4 is a block schematic diagram associated with the reminder system of FIG. 1.

Referring to FIG. 4, previously mentioned remote interface 38 is shown with previously mentioned temperature sensor 49, speaker 42, microphone 44, and video camera 40 connected to terminals TS, SP2, M2, and VIN1 of processor 50. Video camera 40 and microphone 44 are also connected to secondary processor 85 (to be described presently). Previously mentioned pushbutton inputs 46 and 48 are connected to input IN2 of processor 50.

The previously mentioned user interface is shown herein as grouping 52 including previously mentioned annunciator 32, indicators 24 and 26, pushbuttons 20 and 22, display 12, speakers 28, and microphone 30. Buttons 20 and 22 are shown operating through input device 54, which connects to input terminal IN1 of processor 50. Annunciator 32 and indicators 24 and 26 operate through output device 56 shown connected to terminal OUT of processor 50. Display 12, speakers 28, and microphone 30 are shown connected to terminals VO, SP1, and M1 of processor 50. Interface 52 and processor 50 are mounted at the housing (housing 10 of FIG. 1).

Processor 50 is a microcomputer or microcontroller having memory 51 for holding programming information and other data to be described presently. Processor 50 in some cases will comprise a number of components such as a microprocessor, video/audio interface, UART chip, voltage regulator, battery and various input/output devices for accomplishing the methods and features described herein.

Previously mentioned inputs 34A and 34B are shown connected to input AUX of processor 50. Previously mentioned adapter socket 36 is shown connecting to terminal PWR of processor 50. Previously mentioned memory stick port 35 is shown connected to input IN3 of processor 50. Processor 50 also has its terminal TEL connecting to modular telephone jack 55 and its terminal HO connecting to headset 56. Processor 50 also has terminals AIN and AOUT connected to terminals AOUT and AIN of processor 85, respectively.

Processor 50 is shown with a connector 58 designed to plug into connector 59 of optional cradle 60.

Referring to FIGS. 2 and 4, cradle 60 is shown having a back panel 60A projecting from a C-shaped base 60B. Housing 10 fits in the corner formed between panel 60A and base 60B. Connector 58 is recessed on the lower edge of housing 10 while cradle connector 59 projects upwardly from base 60B (these connectors are not visible in FIG. 2). Right and left speaker housings 60C project from base 60B and have the shape of a triangular prism. Cradle 60 has a power indicator light 62 and on the back of panel 60A an AC adapter socket (not shown in FIG. 2 but shown as element 64 in FIG. 4). Housing 10 also has an attachment (not shown in FIG. 2) which enables a user to mount the system under overhead cabinets such as in a kitchen or office cubicle, thereby freeing counter tops or table space.

Referring again to FIG. 4, previously mentioned CCD image sensor 96 and microphone 98 of auxiliary transmitter 94 are shown connected to terminals VIN2 and M3 of processors 50 and 85. An additional wireless auxiliary transmitter 95 is shown having a CCD image sensor 97 and microphone 99 connected to terminals VIN3 and M4 of processors 50 and 85. While this embodiment shows two wireless auxiliary transmitters 94 and 95, up to four (or more) wireless or wired auxiliary transmitters may be connected to additional terminals (not shown) of processors 50 and 85.

Previously mentioned secondary display 88, volume slider 82, talk button 86. speaker 81, microphone 83, camera toggle button 90, and input socket 84 are shown connected to terminals VO, VOL, IN1, SP, M1, IN2, and PWR of processor 85, respectively.

Secondary processor 85 is a microcomputer or microcontroller having memory 87 for holding programming information. Processor 85 in some cases will comprise a number of components such as a microprocessor, video/audio interface, UART chip, voltage regulator, battery and various input/output devices for accomplishing the methods and features described herein. Processor 85 is mounted at the previously mentioned housing (housing 79 of FIG. 11).

Figure 5:
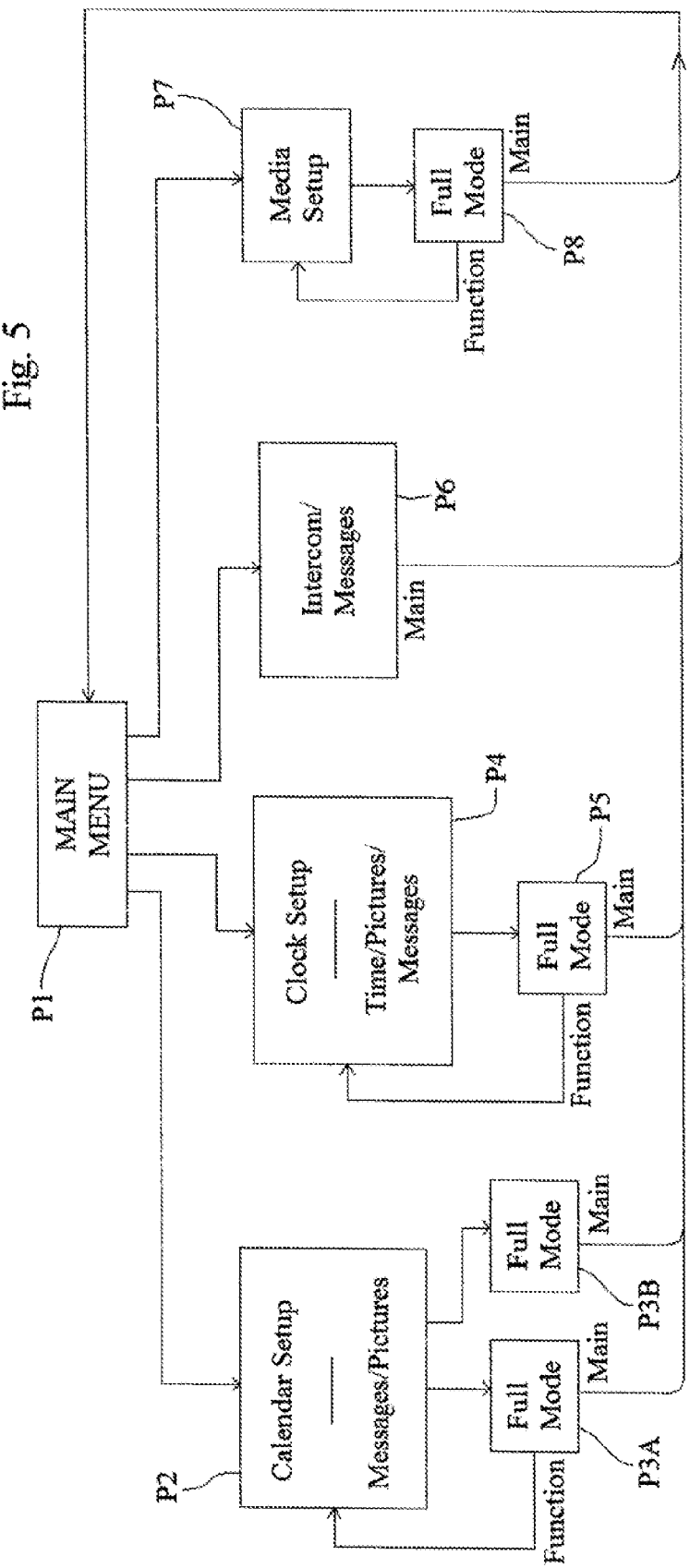
FIG. 5 is a high-level flowchart associated with the processor of FIG. 4.
Figure 6:
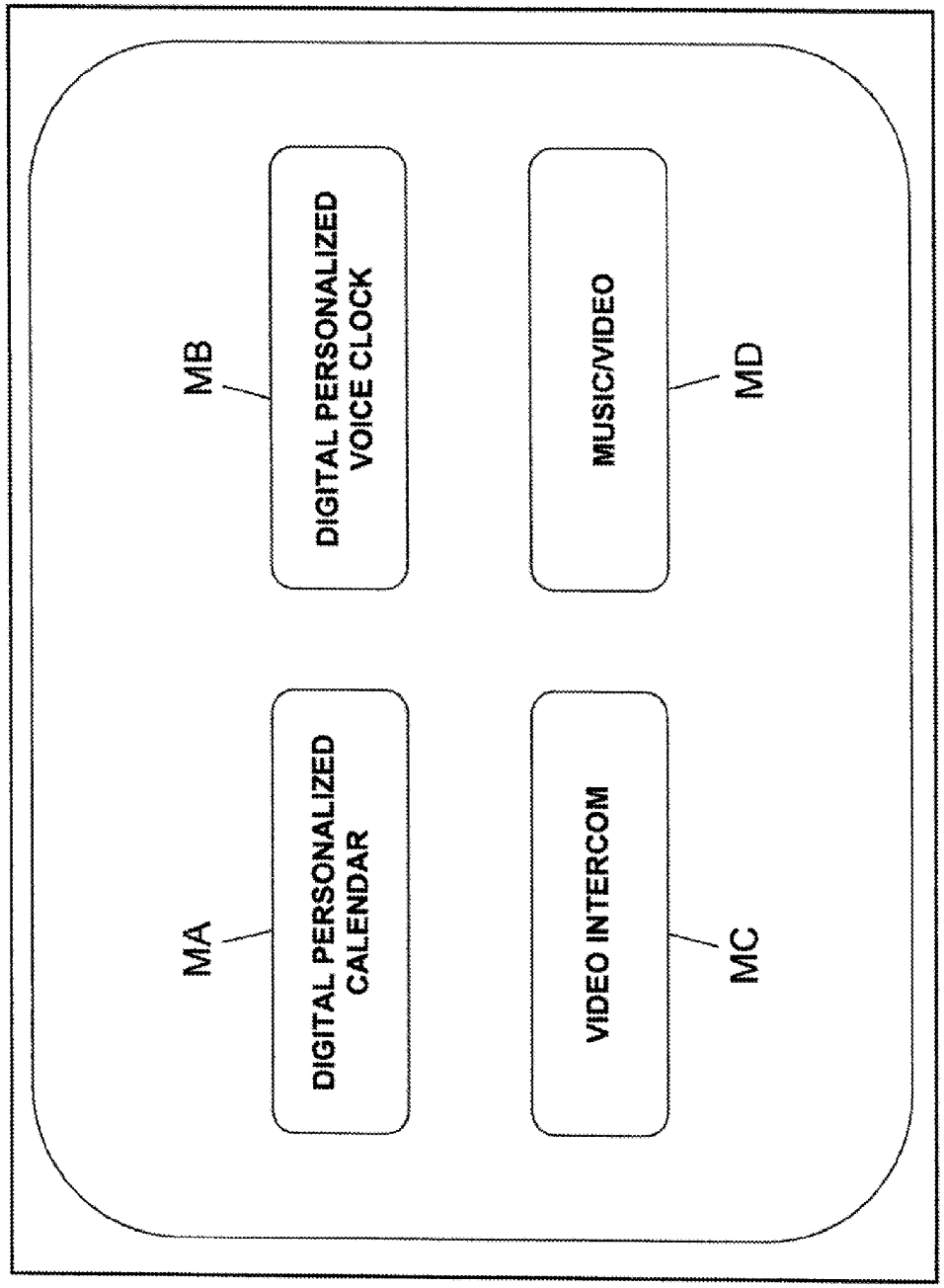
FIG. 6 is a main menu that may be displayed on the screen of the system of FIG. 1.

Referring to the flowchart of FIG. 5 and the block diagram of FIG. 4, programming step P1 causes processor 50 to transmit to display 12 a main menu image as shown in FIG. 6. The menu of FIG. 6 has four touch targets, identified as digital personalized calendar MA, digital personalized voice clock MB, video intercom MC, and music/video MD.

By touching target MA processor 50 transfers control to step P2, which replaces the menu of FIG. 6 with the screen shown in FIG. 7A. This screen has on top a calendar grid 16' similar to grid 16 of FIG. 1. The touching of targets here and in other situations corresponds to generating an output from display 12 in order to send an appropriate signal to terminal VO (FIG. 4) of processor 50 to influence its programming steps.

A number of manual controls are placed below grid 16'. Touch target T9 performs the same function as target MC of FIG. 6 and the operation of these two targets will be deferred. Before operating the other controls a user will enter a security code into touch keypad T3.

The user can set up automatic dialing (the dialing process to be described presently) by recording up to three telephone numbers using the contact keypad T5. For example, the user can touch key 2 in pad T5 and then type in a telephone number using touch pad T3. Also, previously recorded telephone numbers can be eliminated by pressing one of the contact targets in pad T5 and then pressing the delete target DEL among controls T4.

The user may now record and schedule a spoken message under the control of programming step P2. If the user wishes to schedule a message in other than the current month, the desired month should be selected by using the scroll arrows T2A and T2B, which will change the month displayed in annunciator 32 (FIGS. 1 and 4) and reconfigure calendar 16' appropriately. The user will now press one of the date targets in calendar 16' in order to choose a scheduled date. At this point, the user has the option to either write a message on a notepad or record a voice message into any of the voice mailboxes.

To write a message, the user simply presses and holds the date target in calendar 16' briefly (e.g. 2 seconds) and a notepad TS will appear next to the selected date as shown in FIG. 78. The user will then proceed to write a message using a supplied stylus (not shown). Notepad TS of FIG. 7B shows the user-entered messages, which are stored graphically. In some embodiments, messages may be stored differently, such as text generated by the conversion of handwritten input using character recognition techniques. This option enables the user to quickly review messages for scheduled appointments and availability. The user may highlight and delete written messages by pressing the DEL target of group T4. To remove notepad T8 the user may again press the associated date target, to return to the display of FIG. 7A, where other dates can be selected and annotated.

To record instead an audio message, the user will choose a voice mailbox by pressing one of the nine non-zero numeric keys on touch keypad T3. Next, the user will select the desired contact(s), from keypad T5, for that particular message and schedule a time by pressing touch target T1. In response, the annunciator screen (screen 32 of FIGS. 1 and 4) will display time. The displayed hour and minute can be scrolled by repetitively touching targets T1A and T1B, respectively.

When the desired time is displayed the user can now record a message by touching the record button REC among the ten recorder controls T4. The user can speak up to 30 seconds and then end the recording by touching either the STOP target found among controls T4 or the ENTER target in keypad T3.

Processor 50 (FIG. 4) will digitize the microphone audio arriving at terminal M1 and store it in memory 51. The recorded message can be played back by touching the PLAY target, paused by touching the PAUSE target, or deleted by touching the DEL target (all in target group T4).

The play function causes processor 50 (FIG. 4) to fetch the audio information stored in memory 51 and reconstruct it using a digital to analog converter before sending the converted audio to speakers 28. The controls T4 also have a rewind target RRW and fast forward target FFWD for performing these conventional tasks. Also, the audio playback volume can be muted by pressing the MUTE target, and can be decreased (increased) by touching the −target (+target).

At this point the user can change to the full-screen mode by touching target T6, which shifts control to program step P3A or P38 (FIG. 5) depending on a previous selection or step P3A by default. The full-screen modes are illustrated in FIGS. 7D and 7E showing an image 14A above a calendar grid 16" and a full screen image without a calendar grid respectively. This full-screen mode may remain static for an entire month to function as a simple calendar.

When a scheduled date and time arrive, processor 50 causes message indicator 24 (FIGS. 1 and 4) to flash to indicate a scheduled message is now available and due for playback. The user may then press the functions pushbutton 20, which returns control of the processor 50 to the programming step P2 (FIG. 5) to display again the screen shown in FIG. 7A. The user will now enter the security code in touch pad T3, press the date target in calendar grid 16' (either today's or a prior day's target) and use controls T4 to playback the pre-recorded message from memory. This method will play back all messages that have reached their scheduled time. If the user only wishes to listen to messages in a specific voice mailbox, the user may examine only that box number by touching the associated number in keypad T3 before pressing the PLAY target among controls T4. The target DEL among controls T4 may be touched to delete the current message (the one being played back, or the one last played). Processor 50 is programmed to recycle memory by automatically deleting 1 week old messages in order to maximize storage.

If the message is not promptly played back in, for example, 15 minutes after the scheduled time, the system will automatically dial telephone number(s) previously recorded (done with contact pad T5). Accordingly, processor 50 operating through terminal TEL will function as an autodialer. Specifically, processor 50 will take a telephone connected to jack 54 off hook, dial one of the preprogrammed telephone numbers stored in memory 51, and when the called party answers, automatically play back the recorded message also stored in memory 51. In some instances, the telephone may not be hard wired but may be a wireless connection. This automatic dialing process will be repeated for each of the pre-recorded telephone numbers associated with the recording of that particular message. This feature allows family or office members to record a message on the system and have it sent to the desired contact at the scheduled time.

A user who wishes to associate images with the months of the year will press PICTURES target T7 and the screen will change as illustrated in FIG. 7C to a 4×5 matrix of thumbnail images 66 that were stored in memory 51 (FIG. 4). If more than 20 images are available pressing the PICTURE SCROLL target T10A or T10B will display the next or previous 20 images. If no images have been uploaded by the user, default images may be selected, or if the user wishes to upload more images, a regular or mini SD card or a memory stick will be plugged into the connector slots 34A, 34B or 35 (FIGS. 2 and 4) and the images thereon will be automatically uploaded into memory 51 of processor 50.

The user can now select a month by using the scrolling arrows T2A and T2B (FIG. 7C) to display the desired month in annunciator screen 32 (FIG. 1). If the user now touches one of the images in matrix 66, that image will be associated with the displayed month. In this manner each month can have a unique image associated therewith. A user who wishes to display a picture show in the full modes illustrated in FIGS. 7D or 7E may do so by setting the slide to slide interval at 5 or 10 seconds and monthly by touching one of the targets T13A, T13B, or T13D respectively. Target T13C will prevent the images from sequencing so that only the image 14A currently on display will be used. Also, the style of transition from image to image can be selected by using targets T14A and T14B. Depending on the complexity of the application, the transition can be abrupt; a fade out followed by a fade in; egress or shrinkage of a departing image followed by expansion or ingress of a succeeding image, etc. Various presentation techniques such as those used in a Power Point presentation may be applied here.

To launch the slide presentation the user can touch FULL-SCREEN target T15A or T15B to execute programming step P3A or P3B respectively, causing processor 50 (FIG. 4) to transmit the slide images as described above and as depicted in FIG. 7D or 7E, representing one image in the presentation. Also, the user can go back to the function mode of FIG. 7A by pressing function button 20 (FIGS. 1 and 4).

The user may now press home button 22 (FIGS. 1 and 4) to return to the main menu of FIG. 6 (programming step P1 of FIG. 5). If the user now touches target MB processor 50 (FIG. 4) will cause display 12 to present the function screen of FIG. 8A (programming step P4 of FIG. 5). The upper part of the screen has a clock face 68 with hour and minute hands. In this illustrated presentation instead of numerals the hour positions have twelve hourly images that were selected by the user. If the user wishes to display instead numerals, target T24 may be touched to toggle to a numeric presentation. To set the clock time the user will touch target T16 and then use targets T17 and T18 to cycle the hours and minutes, respectively, before touching target T16 again to set the time.

The user may associate a short spoken message (e.g., a three second message) with the top of each hour. The spoken messages will be recited three times. The spoken message can refer to a scheduled activity (e.g., "suppertime"). Alternatively, the user can have a customized hour announcement (e.g., "folks, it's nine o'clock"). In some cases the hourly announcement can be a recorded sound (e.g., a bell, a chime, a whistle, etc.).

The user may select the hour by pressing the desired hour on clock face 68. Alternatively, the user may repeatedly press HOUR target T17 which will highlight the hour position on clock face 68, as well as change the hour displayed on annunciator 32 of FIG. 1. The user may now delete a previously recorded hourly message by touching target T20. If nothing further is done no audio will be produced at that hour. However, the user now touches the record target T19 and speaks, a spoken message will be recorded in memory 51 of processor 50 (FIG. 4) using microphone 30. The recording session, being relatively brief, will end automatically, but can be terminated earlier by pressing ENTER target T23.

The user can play back the recorded message by touching target T21, which will send an appropriate signal to terminal VO of processor 50 in order to fetch the relevant message from memory 51 and play it back by sending an audio signal through terminal SP1. The volume of playback audio can be decreased and increased by touching targets T22A and T22B, respectively.

A user who wishes to associate images with the hours of the day will touch PICTURES target T25 and the upper part of the screen will change as illustrated in FIG. 8B to a 4×5 matrix of thumbnail images 70 that were stored in memory 51 (FIG. 1). if more than 20 images are available touching the PICTURES SCROLL target T26A or T26B will display the next or previous 20 images. If no images have been uploaded by the user, default images may be selected, or if the user wishes to upload more images, a regular or mini SD card, or a memory stick will be plugged into the connector slots 34A, 34B or 35 (FIGS. 2 and 4) and the images thereon will be automatically uploaded into memory 51 of processor 50.

The user can now select an hour by repeatedly pressing HOUR target T17 to highlight in succession the hour positions on clock face 68 as well as display the selected hour in annunciator screen 32 (FIG. 1). If the user now touches one of the images in matrix 70, that image will be associated with the selected hour. Alternatively, the user can operate scrolling arrows T26A and T26B to select and highlight successive ones of the images in matrix 70. By pressing ENTER target T23 the selected hour position will have the selected image associated therewith. This process can be repeated until each of the 12 hour positions have an associated image.

The user can now touch FULL SCREEN target T27 to execute programming step PS (FIG. 5), causing processor 50 (FIG. 4) to send from terminal VO to display 12 the image illustrated in FIG. 8C. It will be appreciated that the user can change the clock appearance so simple numerals can be displayed instead of hourly images. As mentioned before this change is accomplished by a toggling target T24 of FIG. 8A. Also, the user can return to the function mode of FIG. 8A by pressing function button 20 (FIGS. 1 and 4).

If the user presses home button 22 (FIGS. 2 and 4) the home screen of FIG. 6 will reappear. If the user touches target MC programming step P6 will be executed and a screen similar to that of FIG. 9 will be sent to display 12 by processor 50 (FIG. 4). In particular, processor 50 will establish a link between interface 38 (see also FIG. 3) and interface 52. CCD camera 40 will send video to terminal VIN1 of processor 50, which will in turn send that video through terminal VO to display 12. An example of such video is shown as video image 72 in FIG. 9. Accordingly, the user can observe a visitor.

A user may toggle through up to four additional auxiliary cameras by touching camera toggle target T40 (FIG. 9). In this embodiment, two additional auxiliary cameras are utilized. Touching camera toggle target T40 causes processor 50 to now establish a link between interface 52 (FIG. 4) and auxiliary transmitter 94 (FIGS. 4 and 12). CCD image sensor 96 (FIGS. 4 and 12) will send video to terminal VIN2 of processor 505 (FIG. 4) which in turn will send that video through terminal VO to display 12. Video display 72 (FIG. 9) will now show the video output from CCD image sensor 96. In addition, microphone 98 (FIGS. 4 and 12) will send audio to terminal M3 of processor 50 (FIG. 4), which in turn will send that audio through terminal SP1 to speakers 28. A user is thereby provided with a video image and audio of the area where auxiliary transmitter 94 is located.

Touching camera toggle target T40 (FIG. 9) again will cause processor 50 to establish a link between interface 52 and remote transmitter 95. Then the video output of camera 97 and the audio output of microphone 99 will be conveyed to display 12 and speakers 28, respectively, in a manner similar to that previously described.

Touching camera toggle target T40 again will cause processor 50 to reestablish a link between remote interface 38 and interface 52 (since no additional remote transmitters are available to processor 50). In other embodiments utilizing additional remote transmitters, touching camera toggle target T40 will cause processor to link with the additional transmitters before again reestablishing the link between interface 52 and interface 38.

With the link to interface 38 reestablished, if a visitor presses TALK button 46, audio from microphone 44 of interface 38 will be transmitted through processor 50 to speakers 28 of interface 52. The volume of the audio can be decreased and increased by touching volume control targets T28A and T28B, respectively. To stop the receipt of audio from remote interface 38, the user can touch MUTE target T30. To send a spoken message to speaker 42 of remote interface 38, the user will touch TALK target T29 in order to send audio from microphone 30 through processor 50 to speaker 42 of interface 38.

In some instances a visitor will try to summon someone by pressing the talk button 46 and speaking into microphone 44 but without success because the residence is temporarily unoccupied. In that case the visitor can press the record button 48 to command processor 50 to store in memory 51 an audio message (or video with an audio message) from remote interface 38.

After a visitor's message has been recorded, message indicator 24 will flash to alert the user of the existence of this message. By touching target T31 in the touchscreen shown in FIG. 9, the user can command processor 50 to playback the recorded message on speakers 28 and sending video images to display 12 as appropriate. Using targets T32, T33, and T34, the operator can cause the message to pause, stop, or be deleted, respectively. Alternatively, selecting target T9 of FIG. 7A or 7B will cause video intercom mode of FIG. 9 to be displayed allowing the user quick access without going through the main menu.

In some cases various types of media may be displayed on the foregoing apparatus. For this reason a mass storage device may be attached to one of the connectors 34A, 34B or 35 (FIGS. 2 and 4). The mass storage device may be a DVD player, a memory stick, SD card, hard drive, PC or laptop computer, etc. The media may be music videos, slide presentations, music, full-length movie features, etc.

Figure 10B:
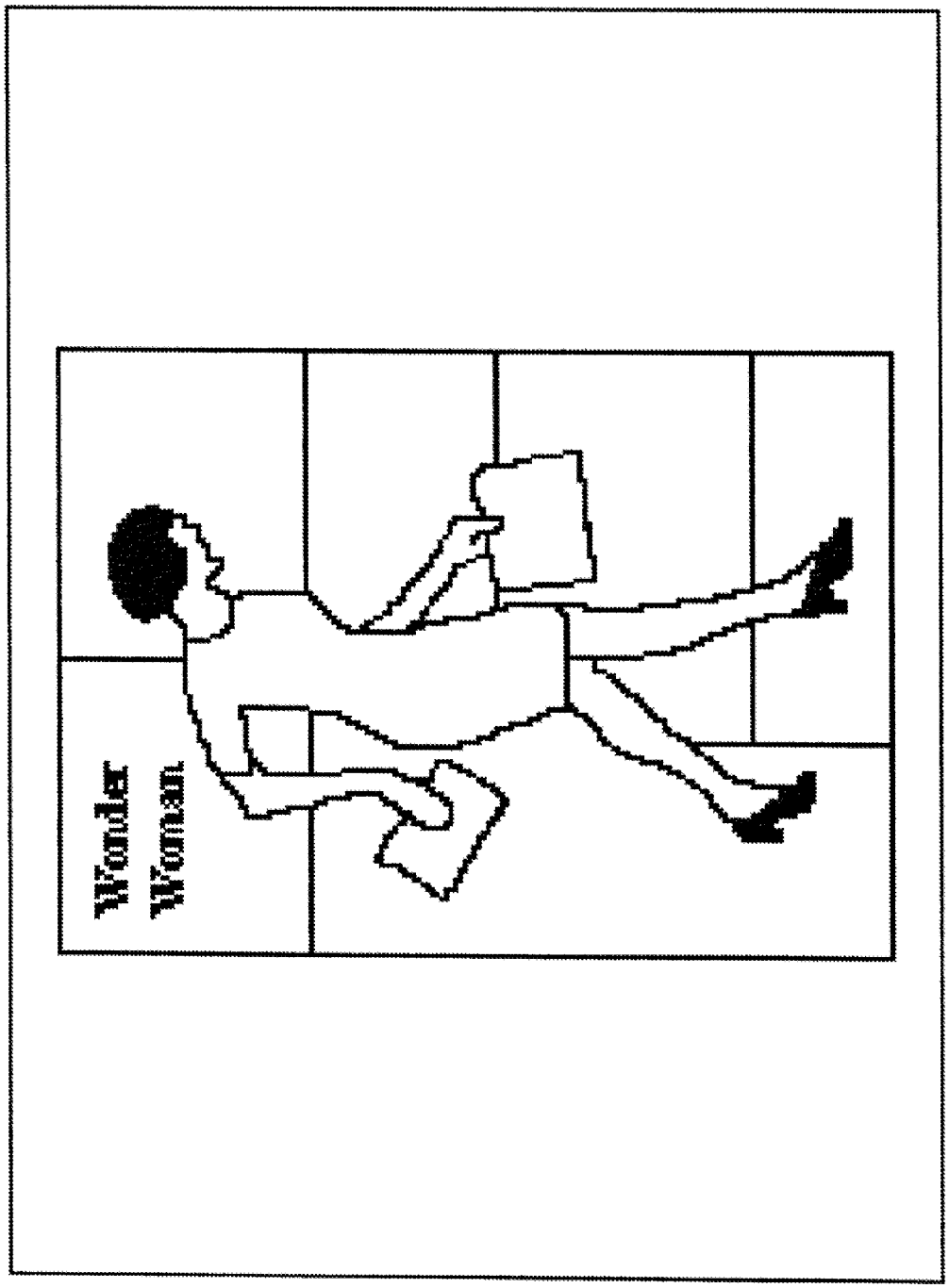
FIG. 10B shows a full mode screen for the media mode associated with the system of FIG. 1.

The user may access this media mode by pressing the home button 22 (FIGS. 1 and 4) and selecting target MD to launch the function mode displayed in FIG. 10A (programming step P7). In this mode the user can operate scrolling arrows T35A and T35B to browse the selection available in the mass storage device connected to connectors 35A, 35B or 35. The selection can be made by touching ENTER target T36.

Thereafter, the user can cause the media to play, stop, pause, fast-forward, or rewind using the manual controls among targets T37. Also, audio volume can be decreased and increased using targets T38A and T38B, respectively. Moreover, the audio can be muted using target T3C. Then by touching target T39 the media can be watched in the full-screen mode shown in FIG. 10B (programming step P8). As before, the user can return to the function mode of FIG. 10A by pressing function button 20 (FIGS. 1 and 4).

Referring to FIGS. 3, 4 and 11, secondary display unit 80 can receive audio and video signals from remote interface 38 and auxiliary transmitters 94 and 95 thereby allowing a user to see and hear what is happening at various locations. Processor 85 initially establishes a link between secondary display unit 80 and remote interface 38. The video signal output from remote CCD camera 40 is conveyed to terminal VIN1 of secondary processor 85, which will in turn send that video through its terminal VO to display 88. The audio signal output from remote microphone 44 is connected to terminal M2 of secondary processor 85, which will in turn send that audio through its terminal SP to speaker 81. A user at secondary unit 80 is thereby able to hear and see what is happening at the location of remote interface 38.

A user may increase/decrease the volume of the audio output at speaker 81 by pushing up/down on volume slider 82 (also referred to as volume control) which transmits a signal to terminal VOL of processor 85 which will then in turn increase or decrease the amplitude of the audio signal output through terminal SP to speaker 81.

A user may switch to additional transmitters by pressing camera toggle button 90 causing processor 85 to respond to the signal on input IN2 by establishing a link with auxiliary transmitter 94. Auxiliary microphone 98 will send audio to terminal M3 of processor 85 which will in turn send that audio through its terminal SP to speaker 81. Auxiliary CCD image sensor 96 will send video to terminal VIN2 of processor 85 which will in turn send that video through its terminal VO to display 88.

Pressing camera toggle button 90 again will cause processor to establish a link with the next auxiliary transmitter, in this case transmitter 95. Audio and video signals from auxiliary transmitter 95 will then be received in inputs M4 VIN3 of processor 85 and conveyed through its terminals SP and VO to speaker 81 and display 88 respectively. Further actuation of camera toggle button 90 causes processor 85 to successively establish links with any other additional auxiliary transmitters (none existing in this embodiment) before again reestablishing a link with remote interface 38.

Secondary unit 80 may also be used to communicate intercom-style with user interface 52. Pressing talk button 86 sends an audio signal from microphone 83 through terminal AOUT of processor 85 to terminal AIN of processor 50 in order to establish an audio link. Processor 50 detects the incoming signal on terminal AIN and checks if there is currently an exchange between remote interface 38 and processor 50. If there is a exchange in progress, a busy tone signifying the preexisting exchange will be output from processor 50 through terminal AOUT to terminal AIN of processor 85, which in turn will output this busy tone through terminal SP to speaker 81 as long as talk button 86 is depressed.

If there is no exchange in progress, processor 50 will output the audio signal received on terminal AIN through terminal SP1 to speakers 28 of interface 28 and show on display 12 the screen of FIG. 9. A user of interface 28 can reply by touching a target on display 12 (target T29 of FIG. 9), which will cause audio signals from microphone 30 on terminal M1 of processor 50 to be transferred to terminal AOUT of processor 50 to terminal AIN of secondary processor 85. Secondary processor 85 in turn will output the incoming audio signals through terminal SP to speaker 81. Accordingly, the two users may communicate intercom-style between unit 80 and user interface 52.

Priority is given to remote interface 38. So if an incoming request signal from talk button 46 or record button 48 of remote interface 38 is detected by processor 50, an existing link with secondary unit 80 will be automatically terminated. In some embodiments, processor 50 will instead provide an indication via display 12 that an exchange is being requested by remote interface 38 and the user may choose to terminate the link to secondary unit 80. In this alternative embodiment, if the user at interface 52 refuses to end the exchange with secondary unit 80, the user at remote interface 38 may leave a message by pressing REC button 48 and processor 50 will record the message while continuing to facilitate the current exchange with secondary unit 80. In some embodiments, unit 80 may also be used to communicate intercom-style with remote interface 38.

It is appreciated that various modifications may be implemented with respect to the above described embodiments. The foregoing housing can have various shapes and sizes and in some cases the equipment may be separated into separate modules. While four separate modes are described in some embodiments only some of them may be used, or additional modes may be added. Also, the programming steps can be performed in different sequences. While a touchscreen is shown, in some embodiments a simple screen will be used and a number of manual pushbuttons will be employed. In addition a plurality of processors may be employed that are specially adapted to specific functions such as playing back media from external sources. Also in some embodiments certain features may be eliminated. For example, some embodiments will not require entry of the security code, only a single (not multiple) voice mail box will be used, the remote interface may lack a camera, etc. While the user can upload images, some embodiments will have preloaded in memory a catalog of stock images. In some embodiments the system will connect over a network or the Internet to a remote terminal that a user may use to set up the system, change its manner of operation, and upload images.

Obviously, many modifications and variations of the present invention are possible in light of the above teachings. It is therefore to be understood that within the scope of the appended claims, the invention may be practiced otherwise than as specifically described.

The invention claimed is:

1. A reminder system comprising:
a user interface having a microphone, display and at least one manually operable control; and
a processor coupled to said user interface and having a memory and a user accessible input for uploading and storing in said memory a plurality of user uploaded images including at least one predetermined image for storage in said memory, said plurality of user uploaded images having spatially varying information, said processor being operable to display simultaneously on said display a calendar image and the predetermined image based on the image information in said memory, said user interface and said microphone being operable to store in said memory at least one pair of a spoken message and a scheduled time, said processor being operable to make said spoken message automatically available at said scheduled time, said calendar image comprising a current one of a plurality of monthly images stored in said memory, said plurality of monthly images being individually paired with one of the plurality of user uploaded images stored in said memory, said user interface being operable to manage pairing between the plurality of monthly images and the plurality of user uploaded images, said user interface being operable to select pairs by allowing user selection of any one of said plurality of monthly images and any one of said plurality of user uploaded images, said processor being selectively operable to display simultaneously on said display one of (a) the calendar image overlaying and partially obscuring one of the plurality of user uploaded images stored in said memory from said input, and (b) the calendar image adjacent to one of the plurality of user uploaded images stored in said memory from said input.

2. A reminder system according to claim 1 wherein said user interface is manually operable to send a security code to said processor in order to allow access to said memory for management of spoken messages.

3. A reminder system according to claim 1 wherein said memory is operable to store up to a predetermined number of different pairs of said spoken message and said scheduled time, said predetermined number being ordered and user selectable.

4. A reminder system according to claim 1 wherein said user interface comprises:
an indicator for indicating arrival of said scheduled time.

5. A reminder system according to claim 4 wherein said user interface comprises:
a local speaker for playing back said spoken message.

6. A reminder system according to claim 5 wherein said user interface comprises:
an annunciator operable to display a date.

7. A reminder system according to claim 5 including a remote interface comprising:

a sound sensor for producing a remote sound signal, said remote interface being operable to send said remote sound signal to said processor;
a camera coupled to said processor for producing a remote image signal having two dimensional, spatially varying information, said processor being operable to present on said display said remote image signal;
a remote speaker for audible output from audio signals provided through said processor, and
a visitor triggerable input for signaling said processor to immediately broadcast said remote sound signal on a real time basis through said local speaker at said processor.

8. A reminder system according to claim 1 wherein said processor comprises:
an autodialer for automatically dialing a predetermined telephone number and sending said spoken message at said scheduled time.

9. A reminder system according to claim 1 wherein said user interface comprises:
a touch screen coupled to said processor for displaying a plurality of date targets for signaling to said processor a date selected by touching one of said date targets, said touch screen being selectively operable to change the plurality of date targets in accordance with a selected month.

10. A reminder system according to claim 1 comprising:
a single housing for said user interface and said processor, said housing having a rear magnet for magnetically attaching said housing to a ferromagnetic surface, said housing having a replaceable face plate, said processor being adapted to be battery powered.

11. A reminder system according to claim 10 comprising:
a cradle for holding said housing and supplying power thereto.

12. A reminder system according to claim 1 wherein said processor has a clock mode for sending to said display a clock image indicating time of day.

13. A reminder system according to claim 12 wherein said user interface is operable to record in said memory a plurality of voice messages assigned to different corresponding hours, said processor being programmed to announce the plurality of sound messages upon occurrence of the different corresponding hours.

14. A reminder system according to claim 12 wherein said clock image comprises a traditional clock face, said processor being operable to display at twelve hour positions of said clock face an associated one of a plurality of user uploaded hourly images stored in said memory, said user interface being operable to manage association of the plurality of user uploaded hourly images with positions on said clock face.

15. A reminder system according to claim 1 wherein said display is a touch screen operable to sense and display hand writing, said processor being operable to present on said display a region for receiving hand writing for storage in the memory together with a user designated date.

16. A reminder system according to claim 1 comprising:
a remote interface coupled to said processor and having a sound sensor for producing a remote sound signal, said remote interface being operable to send said remote sound signal to said processor for storage in said memory, said user interface being operable to retrieve said sound signal from said memory.

17. A reminder system according to claim 16 wherein said processor is operable in a first mode to display a calendar image and in a second mode to display from said memory said at least one of the plurality of user uploaded images without displaying said calendar image, said user interface being manually operable to select one of said first mode and said second mode.

18. A reminder system according to claim 16 wherein said remote interface comprises:
  a camera coupled to said processor for producing a remote image signal having two dimensional, spatially varying information, said processor being operable to present on said display said remote image signal.

19. A reminder system according to claim 1 wherein said processor is operable in a first mode to display a calendar image and in a second mode to display from said memory said at least one of the plurality of user uploaded images without displaying said calendar image, said user interface being manually operable to select one of said first mode and said second mode.

20. A reminder system according to claim 19 wherein said at least one predetermined image comprises a plurality of user uploaded images, said processor being operable in said second mode to sequentially present said plurality of uploaded images.

21. A reminder system according to claim 20 wherein said user interface is operable to adjust transition style and succession rate for said plurality of user uploaded images presented by said processor.

22. A reminder system according to claim 19 wherein said processor has a media mode for conveying to said display externally applied video information comprising one or more of music videos, and full-length movie features.

23. A reminder system according to claim 22 comprising:
  a remote interface coupled to said processor and having a sound sensor for producing a remote sound signal, said remote interface being operable to send said remote sound signal to said processor for storage in said memory, said user interface being operable to retrieve said sound signal from said memory, said processor having a clock mode for sending to said display a clock image indicating time of day.

24. A reminder system comprising:
  a user interface having a microphone, a local speaker, display and at least one manually operable control;
  a remote interface having a sound sensor for producing a remote sound signal; and
  a processor coupled to said user interface and said remote interface, said processor having a memory, said processor being operable to display a calendar image, said user interface and said microphone being operable to store in said memory at least one pair of a spoken message and a scheduled time, said processor being operable to make said spoken message automatically available at said scheduled time, said remote interface being operable to send said remote sound signal to said processor for storage in said memory, said user interface being operable to retrieve said sound signal from said memory, said remote interface comprising
  (a) a remote camera coupled to said processor for producing a remote image signal having two dimensional, spatially varying information, said processor being operable to present on said display said remote image signal;
  (b) a remote speaker for audible output from audio signals provided through said processor; and
  (c) a visitor triggerable input for signaling said processor to immediately broadcast said remote sound signal on a real time basis through said local speaker at said processor.

25. A reminder system according to claim 24 wherein said user interface is manually operable to send a security code to said processor in order to allow access to said memory for management of the sound signal in said memory.

26. A reminder system according to claim 24 wherein said user interface comprises:
  an indicator for indicating storage of the sound signal in said memory.

27. A reminder system according to claim 24 wherein said user interface comprises:
  a local speaker for playing back said sound signal.

28. A reminder system according to claim 24 comprising:
  a secondary display unit coupled to said remote interface for displaying an image derived from said remote image signal, said secondary display having a secondary speaker spaced from said remote speaker and from said local speaker.

29. A reminder system according to claim 28 comprising:
  at least one auxiliary transmitter having an auxiliary camera coupled to said processor and said secondary display unit.

* * * * *